(12) United States Patent
Mayer et al.

(10) Patent No.: US 11,453,174 B2
(45) Date of Patent: *Sep. 27, 2022

(54) FASTENING OBJECTS TO EACH OTHER

(71) Applicant: Woodwelding AG, Stansstad (CH)

(72) Inventors: Jörg Mayer, Niederlenz (CH); Patricia Poschner, Interlaken (CH); Joakim Kvist, Nidau (CH); Mario Lehmann, Les Pommerats (CH); Patrick Mooser, Biel (CH)

(73) Assignee: WOODWELDING AG, Stansstad (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,118

(22) Filed: Jul. 28, 2021

(65) Prior Publication Data

US 2021/0354400 A1 Nov. 18, 2021

Related U.S. Application Data

(62) Division of application No. 16/092,528, filed as application No. PCT/EP2017/058641 on Apr. 11, 2017, now Pat. No. 11,077,621.

(30) Foreign Application Priority Data

Apr. 12, 2016 (CH) .......................................... 478/16
Oct. 7, 2016 (CH) ........................................ 1345/16

(51) Int. Cl.
*B29C 65/08* (2006.01)
*B29C 65/48* (2006.01)
(Continued)

(52) U.S. Cl.
CPC .......... *B29C 65/08* (2013.01); *B29C 35/0261* (2013.01); *B29C 65/4835* (2013.01);
(Continued)

(58) Field of Classification Search
CPC ................ B29C 65/08; B29C 65/4835; B29C 66/30325; B29C 66/721; B29C 66/81431;
(Continued)

(56) References Cited

U.S. PATENT DOCUMENTS

| 3,431,157 A | 3/1969 | Mack |
| 4,315,351 A | 2/1982 | Bartolini |

(Continued)

FOREIGN PATENT DOCUMENTS

| CN | 1119881 | 4/1996 |
| CN | 203961199 | 11/2014 |

(Continued)

OTHER PUBLICATIONS

English translation of International Preliminary Report on Patentability dated Oct. 16, 2018 (Oct. 16, 2018), Application No. PCT/EP2017/058641, 10 pages.

*Primary Examiner* — James D Sells

(74) *Attorney, Agent, or Firm* — Rankin, Hill & Clark LLP

(57) ABSTRACT

A method of fastening a second object to a fiber composite part including a structure of fibers embedded in a matrix material includes: providing the fiber composite part including an attachment surface, with a portion of the structure of fibers being exposed at the attachment surface; providing the second object; placing the second object relative to the fiber composite part, with a resin in a flowable state between the attachment surface and the connector; pressing the second (Continued)

object and the fiber composite part against each other and causing mechanical vibration to act on the second object or the fiber composite part or both, thereby causing the resin to infiltrate the exposed structure of fibers and activating the resin to cross-link; whereby the resin, after cross-linking, secures the second object to the fiber composite part.

22 Claims, 12 Drawing Sheets

(51) Int. Cl.
*B29C 65/00* (2006.01)
*F16B 11/00* (2006.01)
*C09J 5/00* (2006.01)
*B29C 35/02* (2006.01)

(52) U.S. Cl.
CPC ........ *B29C 66/02* (2013.01); *B29C 66/02245* (2013.01); *B29C 66/3022* (2013.01); *B29C 66/3034* (2013.01); *B29C 66/30325* (2013.01); *B29C 66/30341* (2013.01); *B29C 66/326* (2013.01); *B29C 66/721* (2013.01); *B29C 66/81429* (2013.01); *B29C 66/81431* (2013.01); *B29C 66/81433* (2013.01); *B29C 66/81435* (2013.01); *B29C 66/8322* (2013.01); *B29C 66/9513* (2013.01); *C09J 5/00* (2013.01); *F16B 11/006* (2013.01)

(58) Field of Classification Search
CPC .. B29C 66/81435; B29C 66/8322; C09J 5/00; F16B 11/006
USPC ......................................................... 156/73.1
See application file for complete search history.

(56) References Cited

U.S. PATENT DOCUMENTS

| | | |
|---|---|---|
| 4,842,912 A | 6/1989 | Hutter, III |
| 5,415,714 A | 5/1995 | Altmann et al. |
| 8,197,624 B2 | 6/2012 | Beehag et al. |
| 8,250,725 B2 | 8/2012 | Sigler et al. |
| 9,415,543 B2 | 8/2016 | Lehmann et al. |
| 9,688,019 B2 | 6/2017 | Lehmann et al. |
| 11,077,621 B2 * | 8/2021 | Mayer .................... B29C 65/08 |
| 2008/0178986 A1 | 7/2008 | Siavoshani et al. |
| 2011/0061788 A1 | 3/2011 | Stanley |
| 2014/0044476 A1 | 2/2014 | Cove et al. |

FOREIGN PATENT DOCUMENTS

| | | |
|---|---|---|
| CN | 204731795 | 10/2015 |
| JP | 2009-531194 | 9/2009 |
| JP | 2011-501007 | 1/2011 |
| JP | 2013-504703 | 2/2013 |
| JP | 2015-536267 | 12/2015 |
| KR | 10-1025623 | 3/2011 |
| WO | 93/12344 | 6/1993 |
| WO | 2011-080099 | 7/2011 |
| WO | 2014/075200 | 5/2014 |
| WO | 2015/135824 | 9/2015 |
| WO | 2015/162029 | 10/2015 |

* cited by examiner

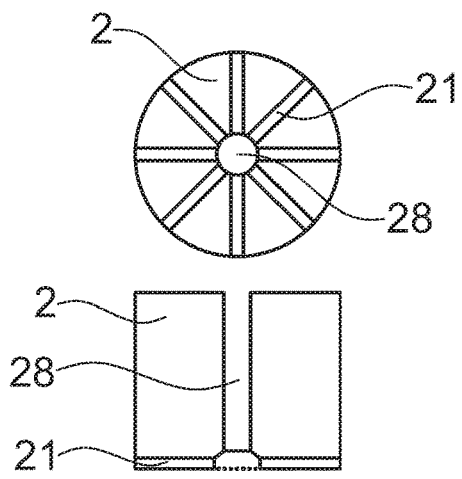
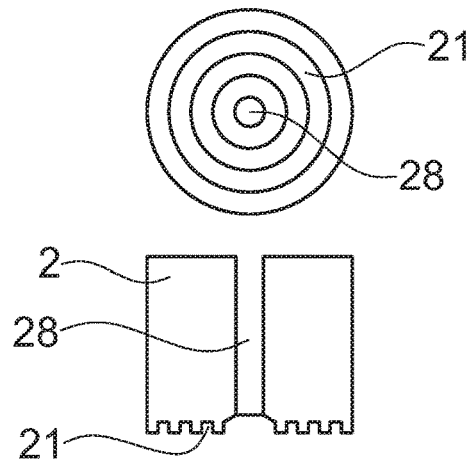
Fig. 4  Fig. 5
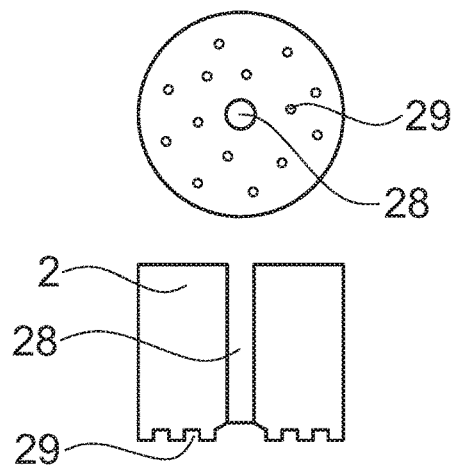
Fig. 6
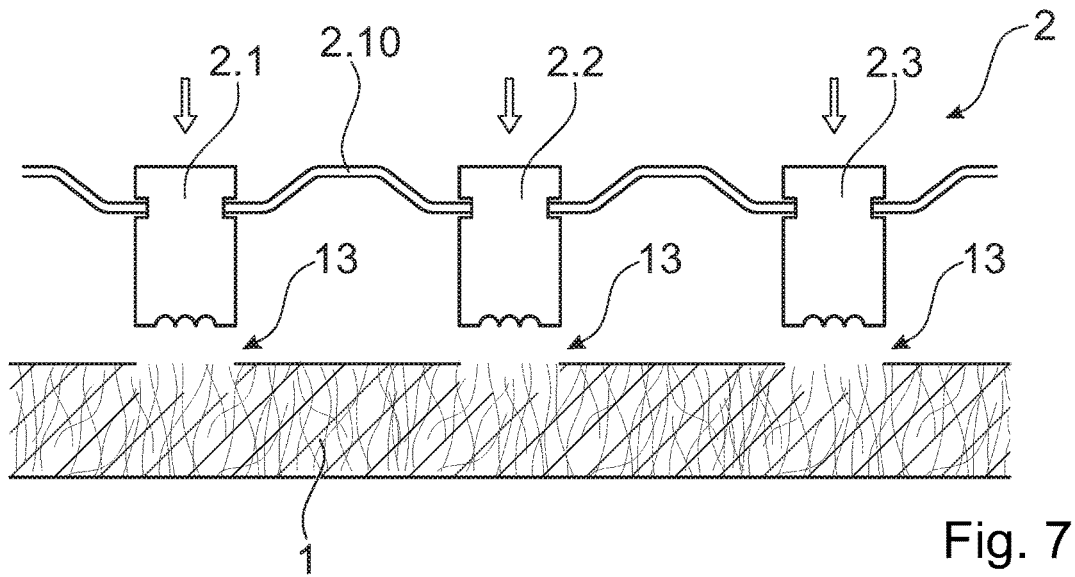
Fig. 7

FASTENING OBJECTS TO EACH OTHER

BACKGROUND OF THE INVENTION

Field of the Invention

The invention is in the fields of mechanical engineering and construction, especially mechanical construction, for example automotive engineering, aircraft construction, railcar construction, shipbuilding, machine construction, building industry, toy construction, etc. It more particularly relates to processes of fastening objects to each other.

Description of Related Art

In the automotive, aviation and other industries, there has been a tendency to move away from steel constructions and to use lightweight material such as fiber composites, especially carbon fiber reinforced polymers, instead.

While fiber composite parts may, given a sufficiently high fiber content and average fiber length and given an appropriate fiber orientation, be manufactured to have considerable mechanical strength, the mechanical fastening of a further object, such as a connector (dowel or similar) thereto is a challenge. Conventional riveting techniques are suitable only to a limited extent, especially due to the small ductility of the fiber composite materials. Also, since such connections require pre-drilling at the position where the further object is to be attached, precision of the positioning may be an issue, especially if several parts that are connected to each other are to be attached to the fiber composite part. Adhesive connections may work well but suffer from the drawback that the strength of a bond cannot be larger than the strength of an outermost layer and of its attachment to the rest of the part. Further, curable adhesive always require a certain curing time for cross-linking. This will considerably increase the production time in case of industrial production. In order to solve this problem, it has been proposed to use UV curable adhesives that tend to cure faster than thermally curing adhesives. However, they require at least partially transparent connectors to allow the curing radiation to reach the curable adhesive. In addition, glue lines will always suffer from sensitivity in terms of layer thickness and homogeneity of glue distribution.

Also other materials than fiber composites, including classical materials such as sheet metal, are increasingly used in lightweight versions, with correspondingly reduced mechanical strength. Therefore, fastenings that require the material to be weakened—for example by a bore or similar—are more and more to be avoided.

In addition to UV curing, the prior art includes an approach of accelerating the curing of adhesives by induction heating. However, this method is restricted to connections that involve metallic parts. Also, inductive heating is relatively unspecific and furthermore not always an option, due to constraints.

It would therefore be advantageous to provide a method of fastening a further, second object (for example a connector) to a first object, which method overcomes drawbacks of prior art method and which especially yields a strong reliable mechanical bond.

SUMMARY OF THE INVENTION

According to an aspect of the invention, a method of fastening a second object to a first object is provided, the method including:
  Providing the first object including an attachment surface;
  Providing the second object;
  Placing the second object relative to the first object, with a resin in a flowable state between the attachment surface and the second object (in this, the resin may be flowable ab initio or at least by the effect of the mechanical vibration, see hereinafter);
  While the resin is in contact with the first attachment surface and the second attachment surface, especially while pressing the second object and the first object against each other, for example by a vibrating tool, causing mechanical vibration to act on the second object or the first object or both, thereby activating the resin to cross-link;
  Whereby the resin, after cross-linking, secures the second object to the first object.

In this text, "resin" denotes any substance that is flowable at least during one stage of the process (generally a viscous liquid) and is capable of hardening permanently by covalent bonds generated between molecules of the resin and/or between molecules of the resin and other substances. For example, the resin may be a composition including a monomer or a plurality of monomers or a prepolymer in a flowable state that is capable of changing irreversibly into a polymer network by curing.

The fastening method according to the invention features the substantial advantage that the first and second objects do not have to be weakened because the achieved bond may be a purely adhesive bond. Also, especially if one of the objects is comparably thin—for example being a metal sheet—the method features the advantage that no through opening has to be made in this object, and hence no measures have to be taken for sealing, electrical insulation, etc. Also, the fastening is independent of pre-defined structures, and this allows to compensate for tolerance mismatch (x-y position adjustment) in a quite straightforward manner.

It has been found by the inventors that the mechanical vibration has a double effect: Firstly it causes the resin to become well distributed and to completely wet/interpenetrate and if applicable embed any structure on the attachment surface thereby cause the resin to penetrate into such structure relatively deeply.

Secondly, the mechanical vibration energy is primarily absorbed at the interface between the first object and the second object and in the resin, thereby stimulating the curing process. More precisely, the resin has been found to cure rather efficiently and predominantly at the interface. If the attachment surface is provided with an according structure, after the hardening process, the resin in addition to causing a material connection (i.e. an adhesive bond) also causes a positive-fit connection due to the fact that it has interpenetrated the structure, which structure may include undercuts. In practice, it has been found (for example, using a commercially available two-component epoxy adhesive as the resin) that the curing process is accelerated compared to how quick it would have been without the ultrasonic vibration by at least an order of magnitude. As a role of thumb, a temperature increase of about 10° C. reduces the setting time by 50%. In practice, a short term, ultrasound induced temperature increase of about 50° C. or even 100° C. may be observed. In embodiments, the second object has a structure different from merely being plane at the attachment surface. Rather, the surface at the attachment surface may have distinct corrugation. Especially, in embodiments the second object has a structure that includes undercuts. Thereby, resin material interpenetrating the structure assisted by the mechanical vibration will, after re-solidification, be secured to the second object by a positive-fit connection.

In embodiments, the first object includes a fiber composite part including a structure of fibers embedded in a matrix material. In a group of embodiments, the fiber composite part will especially include a portion of the structure of fibers being exposed at the attachment surface. Flowable resin material then is caused to interpenetrate the structure of fibers, possible voids in the material are caused to evade. The vibrations may also cause small motions of the fibers themselves, and this helps to prevent spots from not being impregnated at all. An exposed structure of fibers will naturally include structures that define an undercut, whereby the above-mentioned positive-fit connection is achieved without any additional measures being required.

In particular, the method may include the step of causing the portion of the structure of fibers to become exposed, especially by removing an outermost portion of the matrix.

In addition or as an alternative, in embodiments in which the first and/or second object is of a different material than of a fiber composite, the method may include causing a surface roughness of the attachment surface of such object, by a method known for this purpose, for example by mechanical abrasion, etching, etc.

The resin used in these embodiments may be of a same chemical composition as the matrix material of the fiber composite part, or it may be of a different composition.

The fiber composite part may itself constitute a first object to which the second object is to be fastened, or it may constitute a portion of the first object, which first object may include additional portions connected to the fiber composite part.

The fact that the structure of fibers is exposed at the attachment surface means that the structure lacks a homogeneous distribution of the matrix material fully embedding the fibers so that the resin material is capable of flowing into structures formed between and/or underneath the fibers.

In order for the portion of the structure of fibers to be exposed at the attachment surface, the method may include removing matrix material from the attachment surface to expose a portion of the structure of fibers prior to placing the second object relative to the fiber composite part.

Such a step of removing matrix material may include any suitable material removal step. For example, such a step may include sandblasting the attachments surface. Additionally or as an alternative, the step may include chemical etching. In addition or as yet another alternative, the step may include grinding. In either case, the step may include the sub-step of providing a mask and causing only those portions of the surface to be exposed to the material removal for which it is desired that the structure of fibers is exposed.

As an alternative to fiber composite part, also other materials are suitable materials for the first object. In groups of embodiments, such materials especially include a porous or otherwise inhomogeneous structure. An example of such a material is a metallic foam. In addition or as an alternative, the first object may include surface irregularities at the attachment surface, which surface irregularities are caused in an ablating process (mechanical, by irradiation, chemical etching etc.) or in an additive (coating) process.

As an analog to the exposed structure of fibers, in metallic or ceramic first objects exposed structures may be grain boundaries exposed by chemical etching or the generation of etching geometries.

To summarize, the method may include providing the first object with surface irregularities at the attachment surface, which surface irregularities may be constituted by an exposure of a portion of the structure of fibers, by an inhomogeneous ablating or by an additive process.

In addition or as an alternative, the method may include influencing the surface chemistry of the first and/or second object, for example by an additive or ablative process (coating (for example primering), activating, etc.), for example for causing a sufficient surface concentration of OH groups or NH groups.

In many examples described hereinafter, the first object is a fiber composite part. However, the teaching applies also to other first objects, including metal foams, metal sheets or other metal parts (with our without roughened surface), porous or non-porous ceramics, porous or non-porous plastics, or any object, for example provided with surface irregularities.

A further advantage of the approach according to the invention is that the steps prior to bringing the second object into contact with the first object do not require any precision in terms of positioning. A step of removing the matrix material at the attachment surface to expose the portion of the structure of fibers (see below) or another surface preparation step needs to be done only approximately at a position where the attachment is to take place. If precise positioning of the second object with respect to the fiber composite part is required, such precision can be achieved by directly arranging the second part at the desired position. This is in contrast to approaches where, for example, a pre-drilled bore defines the relative position.

This is especially advantageous taking into account the fact that due to the speedy curing caused by the approach according to the invention, the method may readily be integrated in industrial production processes where corresponding equipment is used for placing the objects relative to one another, and tolerance problems may directly be balanced out.

The second object may be a connector and thereby serve for fastening a further object to the first object. To this end, the second object may include a joining structure, such as a threaded portion, a nut portion, a portion of a bayonet or of a clip connector, or any other joining structure. Alternatively, the second object may be a frame or housing or any other object to be fastened to the first object.

In a group of embodiments, the second object includes a second fiber composite—if applicable of a same composition as the fiber composite part or of a different composition. In a sub-group of these embodiments, a portion of the structure of reinforcing fibers of the second object is exposed prior to the step of pressing, whereby the resin also infiltrates the structure of fibers of the second object, with a similar effect as described herein for the fiber composite part.

In other embodiments, the second object, at the second attachment surface, includes a different material from a fiber composite. It may, for example, be metallic, with or without a roughened surface, of glass, ceramic, a polymer-based material, etc. In a special group of embodiments, the second object includes a roughened and/or porous surface structure.

In embodiments, the second object includes a, for example, distally facing second attachment surface that in the step of placing the second object relative to the first object is placed to abut against the attachment surface of the first object (the 'first attachment surface'), with the resin between the attachment surfaces.

In embodiments, such a second attachment surface is provided with at least one indentation (groove/channel, hole or similar) that when the second attachment surface is pressed against the first attachment surface, a cavity is formed, which cavity may serve as buffer volume for surplus resin material and direct the resin flow. Especially, the at least one indentation may form a channel system of for example radially running channels effectively directing the flow. More in general, the second attachment surface may be provided with at least one indentation or protrusion resulting in a macroscopic structure leaving spaces of defined depth at the interface. In an example, the macroscopic structure may be constituted by a pattern of protrusions (spacers) yielding an adhesive gap of defined thickness, wherein the vibrations ensures a reliable filling of this gap, in addition to making an improved distribution and wetting possible.

In addition, such structures tend to increase the surface thereby improving attachment. Such structures may for example constitute positive-fit structures to further strengthen the connection.

In a special group of embodiments, the second object on the side facing the first object may include a geometrically structured thermoplastic contact portion. When the mechanical vibrations act, such geometrical structures may serve as energy directors, and a liquefaction process of the thermoplastic material may locally set in. Thereby, an interpenetrating network is generated between the thermoplastic material and the resin, which network on the one hand may even enhance the attachment strength and on the other hand makes a compensation of geometrical irregularities possible. Further additional heat is generated by absorption of vibration energy by the thermoplastic material further accelerating the curing process. Finally, the interpenetrating network forms, especially due to the ductility of the thermoplastic material, an impact resistant interlayer that allows to compensate the brittleness of the adhesive connection via the resin.

This concept may alternatively or in addition be applied to the first object including thermoplastic material at the first attachment surface.

In addition or as an alternative to the indentation(s) of the second attachment surface a structure including at least one indentation (channel, groove, hole) may be provided on the first attachment surface. Such indentation in the first object may be pre-manufactured (for example in a Resin Transfer Molding process in which the fiber composite part has been manufactured) and/or may be manufactured by a removing step, for example a material removing step with a means (sandblasting, etching or similar) that does not only affect the matrix material but also the fibers.

The first object—or the second object if the mechanical vibration acts on the first object—during the step of pressing may be placed against a support, especially a non-vibrating support. It is also an option to apply the vibration from both sides, i.e. to press vibrating tools both, against the second object and the first object.

In this text, the term "fiber composite part" generally refers to parts that include a structure of fibers, such as an arrangement of fiber bundles, a textile structure of fibers or any other structure of fibers, and a matrix material in which the fibers are embedded. Often, in such a structure, the fibers are so-called "continuous fibers", i.e. fibers with lengths that may exceed 10 mm. The fibers will for example be carbon fibers. Such fiber composites are often referred to as "carbon fiber composites" or "carbon-fiber-reinforced polymers" or "carbon-fiber-reinforced plastics"; often also just as "carbon". Other fibers than carbon fibers, such as glass, ceramic or polymer fibers, are not excluded.

In a group of embodiments, the second object is a fastener having an anchoring plate (or "fastener head") and a fastening element bonded to the anchoring plate. The fastening element can have any property of a state-of-the art fastener and for example be a threaded bolt (with an outer thread and/or an inner thread) a bolt without a thread, but for example with glue channels, a pin, a nut, a hook, an eyelet, a base for a bayonet coupling, etc. The fastener in embodiments of this group may be constituted essentially like a fastener sold under the trade name "bighead" and intended to be glued to a surface of another object.

The anchoring plate of fasteners of this group may in addition or as an alternative to the hereinbefore discussed optional structures of the second attachment surface have at least one through opening. During the process, portions of the resin will then be caused to penetrate into the through opening(s) and to thereby contribute to the fastening effect.

In embodiments of this group, the anchoring plate is provided with at least one spacer protruding from the second attachment surface. Such spacers define a minimum distance between the first attachment surface and the second attachments surface and thereby control a thickness of the resin layer. The spacer size on the one hand and the resin composition and the requirements (for example thermal extension mismatch compensation) of the attachment may therein be adapted to each other.

The spacer(s) may especially be arranged near the opening(s), for example forming a collar surrounding the opening (s). In this embodiment, the spacer(s) has/have the additional effect of assisting control of the amount of resin that flows back towards proximally by the effect of the pressing force and the vibration.

The vibrating tool used for coupling the vibration into the assembly may be adapted to the second object (fastener) for the tool to couple the be pressed directly against a proximally facing surface of the anchoring plate. In many embodiments, especially including but not restricted to the embodiments where the vibration is longitudinal vibration, the vibrating tool is therefore adapted to be pressed against a proximally facing surface of the anchoring plate.

To this end, the vibrating tool may include a receiving indentation for the fastening element and be in force and vibration transmitting contact with the anchoring plate.

The receiving indentation or other structure of the vibrating tool may be equipped to be a guiding structure cooperating with the fastening element to guide the second object relative to the vibrating tool. Such guiding structure may be configured as a fastening structure cooperating with the fastening element for fastening the second object to the vibrating tool. Alternatively, it may be a loose guiding structure for example laterally guiding the fastening element while being de-coupled with respect to axial relative movements.

A possible issue may be the confinement of the resin, which may be initially relatively flowable, during the process, especially since the mechanical vibration initially enhances the mobility of the resin.

A first option of a lateral confinement is to provide the second object and/or the first object with a peripheral confining feature confining the resin during the step of pressing the second object and the first object against each other and causing mechanical vibration to act. Such peripheral confining feature may for example include a peripheral annular distally facing collar of the second object, for example of a same or similar extension than the spacer(s) (if any). Such peripheral annular collar may alternatively serve as the (only) spacer. It is also possible to provide the second object and/or the first object with a surface shape that bulges away from the resin side at the location of the resin, i.e. the second object bulges towards proximally and/or the first object bulges towards distally. Thereby, a pocket is formed for the resin. The confining by such shape may be such that the pocket is closed towards laterally, or that the pocket is open, whereby a certain reduced lateral flow of the resin out of the pocket and/or into the pocket remains possible.

A second option of a lateral confinement is to provide the vibrating tool with a peripheral confining feature. Such peripheral confining feature may include an annular protrusion peripherally of the second object and projecting towards the first attachment surface.

According to a third option, a separate confining element may be used that at least partially surrounds the second object (if applicable, for example, the anchoring plate) to confine the resin.

The options may be arbitrarily combined.

Dispensing the resin prior to bringing the attachment surfaces together may include using a dispensing tool to dispense the resin on the first attachment surface and/or on the second attachment surface.

In a group of embodiments, the method includes applying a resin to a relatively large portion of a surface of one of the objects prior to placing the second object relative to the first object and activating the resin to cross-link by the mechanical vibration.

This group is especially suited for embodiments in which the second object (and for example also the first object) is plane and sheet-like or at least has a plane, sheet-like portion.

If two objects having a relatively large common surface are to be bonded to each other by an adhesive bond, according to the prior art, in a manufacturing process after bringing the first and second objects together, with the adhesive between the attachment surfaces, the process had to wait until the adhesive was sufficiently hardened. Alternatively, rivets were used for provisionally stabilizing the relative positions of the first and second objects until the adhesive had sufficiently hardened. Rivet connections have well-known advantages briefly discussed in the introductory part of this text.

In accordance with the mentioned group of embodiments, the activation is carried out selectively, only for a discrete location or a plurality of discrete locations, with the resin remaining un-influenced at positions different from the discrete location(s). Thereby, the resin at the discrete location(s) may provisionally stabilize the assembly of the first and second objects until the adhesive material has fully hardened, for example after a waiting time or heating step. Thereby, the group of embodiments brings about the advantage of provisional stabilization (with the possibility of further processing the assembly) without the disadvantages of a rivet or similar (screwed etc.) connection.

In embodiments of this group, a possible challenge in this may be that depending on the stiffness of the second object it may be difficult to selectively couple the vibration through the second object into the desired spot without too much vibration energy being dissipating through the second object towards laterally, for example along a second object sheet plane.

In a sub-group of embodiments, the second object is of a material that is locally sufficiently pliable to selectively couple the vibration to that portion of the resin that is immediately underneath the vibrating tool, which couples the vibration into the second object.

In addition or as an alternative, the second object includes a local deformation, for example embossment that has energy directing properties. For example, such local deformation may include a corrugated structure, whereby the corrugation serves as energy director.

In addition or as a further alternative, the second object may include a vibration de-coupling structure (which works in a joint-like manner) around the discrete location, for example a groove.

As a further alternative, which may optionally be combined with the mentioned possibilities, an auxiliary element is placed at the discrete location between the first and second objects. Such auxiliary element serves as absorber for mechanical vibration energy and thereby heats the surrounding resin material in a targeted manner. The auxiliary element may include an energy director for this purpose. Such auxiliary element may include thermoplastic material.

In embodiments, such an auxiliary element may be of a thermoplastic elastomer. Then, the E modulus may be adjusted to the according modulus of the resin (after cross-linking). The mechanical properties will then be influenced at most minimally.

In embodiments, such auxiliary element may be deposited together with the resin. For example, if the resin is deposited as a resin bead by an according automatized tool, the auxiliary element may be deposited by the tool together with the bead.

In embodiments, the auxiliary element may be shaped to be extended over a large portion of the interface between the first and second objects, for example by being a flexible planar structure, such as a mesh or similar, forming energy directing structures distributed over a large surface, for example in a regular pattern. A flexible planar structure in this context is a planar structure that is deformable without substantial force input and without substantial spring-back effect, such as a piece of textile, a mesh, a foil, etc. In some embodiments, instead of being a flexible planar structure, the auxiliary element may also be a stiff planar structure.

In embodiments with an extended auxiliary element, depositing of the auxiliary element does not necessarily have to be with precise positioning, even if the position of an adhesive connection with rapid hardening triggered by the vibration needs to be precisely defined, because such precise definition then may be caused by the position of the tool by which the vibration is applied.

In accordance with a possibility, a position of the auxiliary element may be defined by an according structure of the first or second object, for example a guiding indentation (guiding hole) of the first/second object cooperating with a corresponding protrusion of the auxiliary element.

If the auxiliary element includes thermoplastic material that is made flowable during the process, a flow portion thereof may in addition to the heating effect also lead to a material flow, thereby have a stirring function on the resin and induce additional structure that contributes to the fastening effect of the resin.

An auxiliary element in addition to serving as an absorber also may have the function of being a spacer and thereby defines a thickness of the resin between the first and second objects.

In a group of embodiments, the first object or the second object is at least partially of a thermoplastic material, and the other one (the second object or the first object) has a piercing portion that is equipped to pierce into the thermoplastic material of the first object or second object, respectively, during the step of applying the pressing force and the mechanical vibration.

The piercing portion may include a piercing tip and optionally may include an undercut with respect to axial direction.

The piercing portion during the process acts as vibration energy director and by the impact of the vibration energy locally makes the thermoplastic material flowable. This firstly has the effect of allowing the piercing portion to penetrate into the first object whereby after re-solidification of the flowable thermoplastic material portions an additional anchoring (in addition to the effect of the resin) is achieved. Also, possible disruptions in the first object material are levelled out by the flowable thermoplastic material (healing effect). As a second effect, the absorbed mechanical vibration energy leads to a local heating of the assembly around the interface between the piercing portion and the first object, whereby the resin is subject to additional local activation, as explained hereinbefore.

The piercing portion for the mentioned reasons provides a quick and primary stability, even if not the entire resin is hardened out. This may be important in manufacturing processes where the assembly needs to quickly have sufficient stability to move on to a next manufacturing step.

In another group of embodiments, the second object and/or the first object is at least partially made of thermoplastic material and includes at least one energy directing feature—such as a protrusion forming a tip or edge—that during the process is caused to be in contact with the first object or second object, respectively. When the vibration and pressing force are coupled into the assembly, energy will be absorbed locally at the place(s) of the energy directing feature(s). This will cause the thermoplastic material of the energy directing feature to become locally flowable and will cause a deformation. Due to the energy absorption at the protrusions, the resin will be subject to additional local activation around the protrusions leading to local hardened zones that ensure primary stability spots even if not the entire resin is hardened yet.

In these embodiments, the flowable material around the energy directing features may optionally in addition have the function of contributing to the process and/or to the fastening effect, for example by causing a weld to the respective other object (if the materials are correspondingly chosen), to cause a positive-fit connection, etc and/or by contributing to the process control, for example by defining the distance between the first and second objects at which the mechanical resistance against being further moved against each other becomes high, etc.

In embodiments, the second object and/or the first object is shaped for the resin to cause a positive-fit connection in addition to the adhesive bond. To this end, the second and/or first object may be provided with a structure for the resin to flow into in a manner that after re-solidification an undercut is achieved. In a sub-group of such embodiments, if the second object/first object has a relatively thin sheet-like portion, such structure may include an opening in this second object/first object through which a portion of the resin can escape and flow into an open space beyond the opening, i.e. proximally of the second objet portion that has the opening and/or distally of the first object portion that has the opening, respectively. Thereby, a button-like positive fit connection is caused after hardening of the resin.

A tool by which the vibration is applied may be a sonotrode coupled to a device for generating the vibration. Such a device may, for example, be a hand-held electrically powered device including appropriate means, such as a piezoelectric transducer, to generate the vibrations.

The mechanical vibration may be longitudinal vibration; the tool by which the vibration is applied may vibrate essentially perpendicular to the surface portion (and the tool is also pressed into the longitudinal direction); this does not exclude lateral forces in the tool, for example for moving the tool over the surface portion.

In other embodiments, the vibration is transverse vibration, i.e. oscillation predominantly at an angle, for example perpendicular, to the proximodistal axis and hence, for example, parallel to the first and second attachment surfaces. Vibration energy and amplitude in this may be similar to parameters of longitudinal vibration.

In a further group of embodiments, which may be viewed as a sub-group of embodiments with transverse vibration, the oscillation may be rotational oscillation, i.e. the vibrating item vibrates in a back and forth twisting movement.

The vibrating tool in many embodiments is used to press the second object against the first object while the vibrations act. For applying a counter force to the first object, a non-vibrating support may be used (i.e., the vibrating tool presses the second object and the first object against a non-vibrating support). Such non-vibrating support may, for example, be a working table or be constituted by a frame that holds the first object, etc.

In a group of embodiments, a control foil is used for the process. Such control foil (or auxiliary foil) may be present between the non-vibrating support and the first object and/or between the tool and the second object (or generally between the tool and the object(s) against which it is pressed and/or between the non-vibrating support and the object(s) that is/are pressed against it.

Such control foil may, for example, be of a plastic that does not become flowable under the conditions that apply during the process, for example polytetrafluoroethylene (PTFE), or of paper.

The foil has the following possible functions:

Force impact distribution: Especially if the first and/or second objects are sheet-like, they will have their own vibration behavior with resonance frequencies and wavelength generally not equal to the frequency and wavelength, respectively, of the coupled-in vibration. This will lead coupling only at certain contact points instead of over an entire contact surface and to losses. The comparably soft foil will balance out such mismatches (will balance out impedance mismatches) and thereby improve the coupling properties.

Heat flow prevention: Often, applicable sonotrodes and/or applicable non-vibrating supports (for example working tables) are of a metal or of another good heat conductor. The intimate direct contact between the sonotrode/support on the one hand and the second/first object on the other hand will result in a substantial flow of heat into the sonotrode/support. The efficiency of the process goes down as a consequence. The control foil has a heat insulating effect drastically reducing the heat flow.

The control foil in this is used as auxiliary element that is removed after the process. To this end, the control foil is of a material that does not stick to the second object/first object.

Optionally, the control foil may be present as a coating of the vibrating tool/the non-vibrating support.

The mechanical vibration may be ultrasonic vibration, for example vibration of a frequency between 15 KHz and 200 kHz, especially between 20 KHz and 60 kHz. For typical sizes of second objects (for example with characteristic lateral dimensions of about 1 cm) and dimensions of composite parts for example for the automotive industry (car body parts), a power of around 100-200 W has turned out to be sufficient, although the power to be applied may vary strongly depending on the application.

In any embodiment, there exists the option of carrying out the method by a tool that includes an automatic control of the pressing force. For example, the device may be configured to switch the vibrations on only if a certain minimal pressing force is applied, and/or to switch the vibrations off as soon as a certain maximum pressing force is achieved. Especially the latter may be beneficial for parts of which an undesired deformation must be avoided, such as certain car body parts.

To this end, according to a first option the capability of piezoelectric transducers to measure an applied pressure may be used. According to a second option, a special mechanism can be present in the device. For example, a unit that contains the transducer and to which the tool (sonotrode) is attached may be mounted slideable against a spring force within a casing. The device may be configured so that the vibrations can be switched on only if the unit is displaced by a certain minimal displacement and/or only if it is not displaced by more than a certain maximum displacement. To achieve this, means well-known in the art such as light barriers, sliding electrical contacts, position sensitive switches or other means may be used. Also a collapsible sleeve or similar of the kind described hereinafter may contain or operate a contact or switch or similar to control the pressing force.

The vibration frequency can influence the manner in which the vibrations act. A lower frequency will lead to a longer wavelength. By adapting the wavelength to the dimensions of the part to be completed, the operator can have an influence on in which depth the effect of the vibrations is the strongest and on whether the energy is primarily absorbed in a 'near field' regime, in a 'far field' regime or in an intermediate regime.

The invention further contains a kit of parts for carrying out the method, the kit of parts including the resin material (to be precise: raw material for the resin material, which may for example include two components to be mixed to yield the resin) as well as a second object and a vibration application tool (for example sonotrode) having a distal outcoupling face adapted to a proximally facing incoupling face of the second object. The kit may further include a material removal device, such as a sandblasting device.

BRIEF DESCRIPTION OF THE DRAWINGS

In the following, ways to carry out the invention and embodiments are described referring to drawings. The drawings, which are schematical in nature, use the same reference numerals for the same or analogous elements, and show:

FIGS. 4-6, in bottom view and in section, different second objects;

FIG. 7 a configuration with a second object including multiple components;

DESCRIPTION OF THE PREFERRED EMBODIMENTS

Figure 1A:
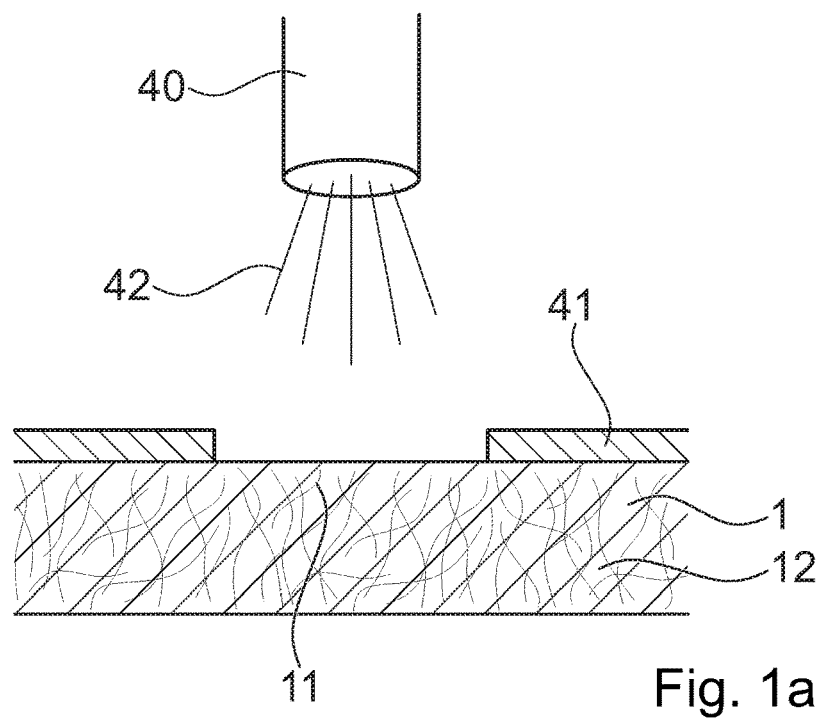
FIGS. 1a-1d sections of a fiber composite part during different steps of a method of attaching a second object thereto.

FIG. 1a shows, in section, a fiber composite part 1 that has a structure of fibers 11 embedded in a matrix 12 of hardened resin. For illustration purposes, in all depicted examples, the fiber composite part is assumed to have a general flattish shape, as has for example a car body part, or an aircraft's wall or the like. All examples of the invention are, however, also applicable to first objects that are not flattish but have any other shape.

FIG. 1a schematically shows the step of removing matrix material from a spot on the attachment surface (the proximally facing surface; the top surface in the orientation shown in FIG. 1a). A sandblasting device 40 creates a jet 42 of abrasive particles that remove matrix material but the energy of which is not sufficient to systematically damage the fibers 11.

In the configuration of FIG. 1a, a mask 41 is used to cover portions of the surface that are not to be sandblasted. Instead of using a mask, the sandblasting device may be aimed so as to remove matrix material only at the desired location.

Figure 1B:
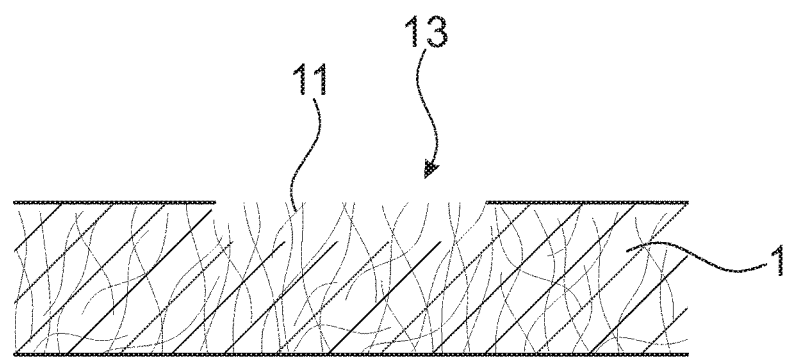

FIG. 1b shows the fiber composite part 1 after the step of exposing the portion of the structure of fibers: along an exposed surface part 13 of exposed fibers 11 the matrix material is essentially removed at least to some depth. In practice the depth may be a few tens of micrometers or more, for example more than 50 micrometers.

Figure 1C:
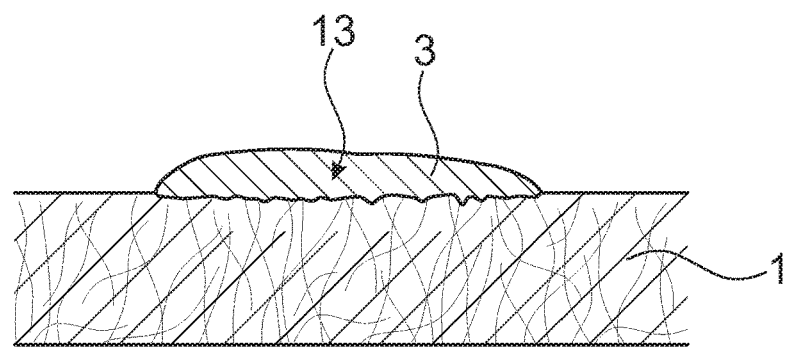

Thereafter, a resin portion 3 is placed on the exposed surface part 13 (FIG. 1c). The resin may, for example, be a two-component mix of a resin, e.g. an epoxy or polyester resin. The resin portion may optionally fully cover the exposed surface part 13, but this is not necessary.

In addition or as an alternative to dispensing the resin portion on the fiber composite part 1, the resin may also be dispensed on the second object.

Figure 1D:
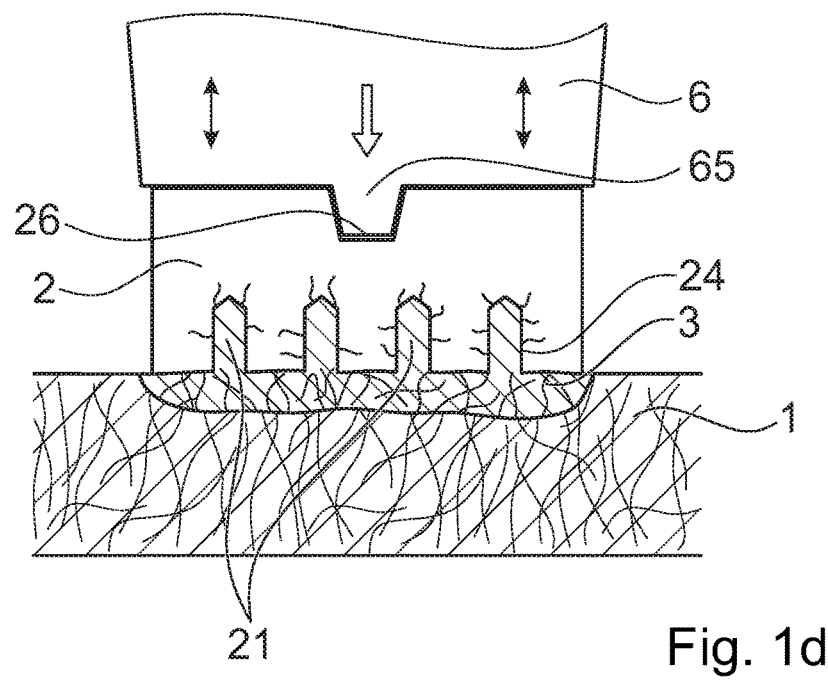

Thereafter, as shown in FIG. 1d, the fiber composite part and the second object 1 are pressed against each other, with the resin between the respective attachment surfaces (constituted by the distally facing surface of the second object 2 and the proximally facing surface of the fiber composite part).

In the depicted configuration, the second object includes a plurality of indentations, namely channels 21 in the second attachment surface. Because of the pressing force, the resin will at least partially fill these channels 21.

Also (this is an option independently of whether the second object includes indentations or not), the second object 2 is of a fiber reinforced composite, with fibers 24 exposed at positions where there will be a contact with the resin.

In the step of pressing, a sonotrode 6 presses the second object 2 against the fiber composite part 1, which latter rests against a non-vibrating support (not shown in FIG. 1d). At the same time, mechanical vibration, especially ultrasonic vibration, is coupled into the second object. By the effect of the vibration, the resin is caused to effectively infiltrate the exposed fibers of the fiber composite part and, if applicable, of the second object. At the same time, the mechanical vibration energy absorbed will cause the resin to be locally heated where it is at the interface between the fiber composite part and the second object. Thereby, at these places the curing process is substantially accelerated, whereby the time span between the step of placing and sufficient curing for the connection to be mechanically stable is substantially reduced, for example from a few minutes (without vibration) to a few seconds (with vibration). This does not affect potential surplus portions of resin that is laterally besides the attachment location, so that after the process such surplus portions may readily be removed.

The sonotrode 6 includes an optional guiding protrusion 65 that cooperates with a guiding indentation 26 of the second object. Such cooperating guiding features are an option for all embodiments.

Figure 2:
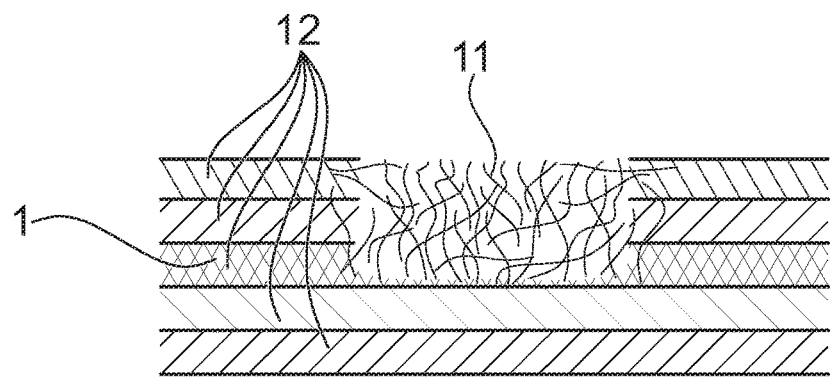
FIG. 2 a fiber composite part with a prepared exposed spot.

FIG. 2 depicts, at a stage corresponding to the stage shown in FIG. 1b, a fiber composite part having a plurality of distinct layers 12. The process according to the invention may be carried out such that the depth of exposure of the fibers 11 at the attachment location is less than or equal to the thickness of the proximal-most layer, or it may be carried out, as depicted, so that fibers of several layers 12 are exposed.

Figure 3:
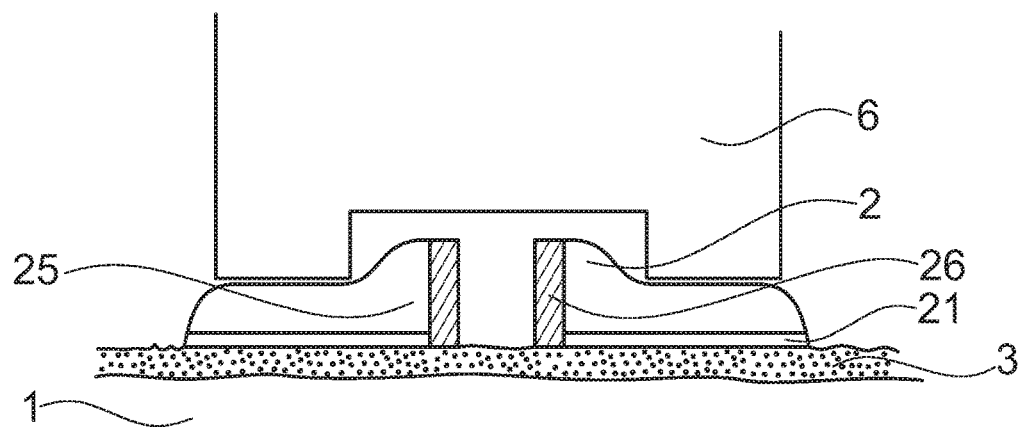
FIG. 3 an alternative configuration of a fiber composite part with a second object and a sonotrode.

FIG. 3 shows a similar configuration to the one of FIG. 1d. The following additional features are shown, which features are independent of each other and may be realized individually or in arbitrary combinations.

The second object 2 is heterogeneous and includes a part 25 of a plastic material (for example a fiber reinforced composite) and further includes a part 26 of a different material, for example metallic. (As a further alternative, not shown in FIG. 3, the second object may be homogeneous or heterogeneous and for example metallic (of aluminum, steel, pressure die-cast magnesium), or thermoplastic, for example injection molded, or of ceramic, or any other suitable material, or of a combination of these.

The second object 2, being a connector, includes a fastening structure for fastening a further object to the second object (and thereby to the fiber composite part 1). To concretize, in the depicted embodiment, the fastening structure is constituted by an inner thread of a nut portion, which nut portion in the depicted embodiment constitutes the part 26 of a different material. More in general, a fastening structure in a heterogeneous object may be formed by any one of the parts, or by a combination. A fastening structure may also be present in a homogeneous second object.

The second object 2 has a (central) portion of enhanced thickness and a (peripheral in FIG. 3) portion of smaller thickness. This may be advantageous in case a certain depth is required—for example for the fastening structure—but the overall dimension should be minimized. Due to the portion of smaller thickness, the footprint of the attachment location may be larger for a given second object volume.

The shape of the sonotrode 6 is adapted to the shape of the second object 2. Especially, in the shown configuration the sonotrode includes a central indentation and a peripheral outcoupling surface, whereby only the outcoupling surface is in contact with the second object during the process.

The channels 21 are radial channels so that the material flow of resin material may be controlled even if the amount of dispensed material is not precisely chosen.

FIG. 4 shows an example of a second object (connector) with radially running channel 21. A further, proximodistal channel 28 is not restricted to the second attachment surface but leads from the attachment surface proximally and constitutes a through-going longitudinal bore. It may be used for equating the resin flow or even for dispensing the resin after positioning the second object.

The proximodistal channel 28 and the channel(s) of the distal surface of the second object (connector) are independent of each other, i.e. a proximodistal channel 28 is not required for any second object with channels in the distal surface and vice versa.

In the variant shown in FIG. 5, the channels 21 are not radial but circumferential.

Figure 25:
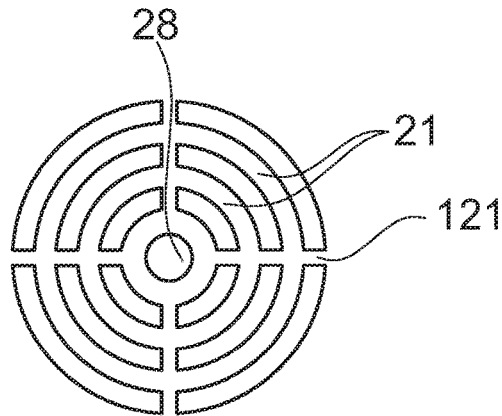
FIG. 25 a bottom view of a further second object.

In the variant of FIG. 25, the circumferential channels 21 are connected by radial connections 121, whereby shear flows are possible, and the exposure of the resin to cavitation effects is reduced compared to a configuration with unconnected circumferential channels as depicted in FIG. 5.

In the embodiment of FIG. 6, the indentations are formed by blind holes 29 arranged in a pattern.

As an even further alternative, the radial and circumferential channels can be combined, resulting in a pattern of protrusions (nubs-like and/or feet-like structures). More in general, an arrangement of such protrusions—acting as spacers, for example of equal thickness—of any shape may define, by their height, a minimal overall thickness of the resin layer, which minimal thickness may be chosen to be between 0.05 mm and 1 mm, for example between 0.1 mm and 0.5 mm.

Generally, and independent of the shapes of the first/second objects, and independent of whether the first object includes a fiber composite or not, in addition or as an alternative to the discussed structure(s), the following approach may be chosen:

the second object and/or the first object includes thermoplastic material along the respective attachment surface.

The resin is applied as an ingredient of a preparation that in addition to the resin also includes thermoplastic particles, especially a thermoplastic powder mixed into the resin. Thereby, the particle size will initially define the thickness of the bonding gap. Further, the mechanical vibration in addition to accelerating the curing process will cause the thermoplastic particles to become flowable and to become welded to the respective thermoplastic material along the attachment surface. Again (as in the approach discussed hereinbefore), a network of interpenetrating structures is generated, resulting in an impact resistant, strongly bonding interlayer.

FIG. 7 illustrates the principle of attaching the second object at a plurality of attachment locations, simultaneously or sequentially. For example, the second object may have a plurality of attachment portions, the spatial relationship of which with respect to each other is precisely defined. In prior art approaches (except gluing), this demanded drilling holes into the fiber composite part very precisely at the locations corresponding to the attachment locations. Due to the approach according to the present invention, it is sufficient to provide exposed surface parts 13 only approximately where the attachment is to take place. The attachment locations are then attached simultaneously (or one after the other—or in sub-groups—in the way discussed hereinbefore).

In the embodiment of FIG. 7, the second object 2 includes a plurality of second object anchor parts 2.1, 2.2, 2.3 that fasten a main portion 2.10 relative to the fiber composite part 1. In the shown embodiment, the anchor parts are reversibly attached to the main portion 2.10, for example by a clip connection. For fastening the main portion 2.10, instead of having to precisely position the anchor parts (as would be the case for conventional dowels) to fit the pattern of connecting locations of the main body, the second object 2 may be placed relative to the composite part 1 with the anchor parts attached. Thereafter the fastening process may be carried out, and then if required, the main portion 2.10 may reversibly be removed, for example if it is desired that the main portion is not exposed to subsequent manufacturing steps.

Figure 8:
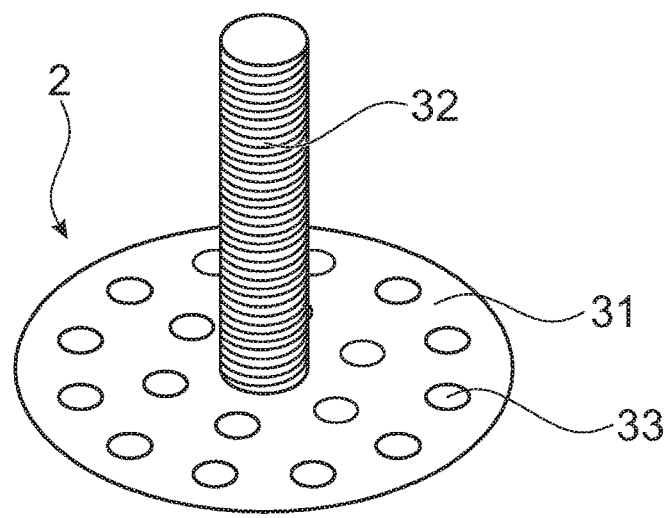
FIG. 8 a fastener constituting a second object.
Figure 9:
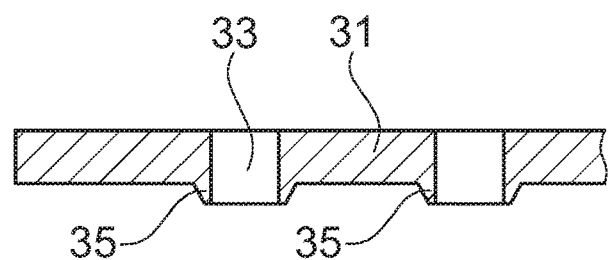
FIG. 9 a partial cross section through an anchoring plate of a fastener of the kind shown in FIG. 8.

FIG. 8 depicts a second object 2 that is a fastener having an anchoring plate 31 (or "fastener head") and a fastening element 32 bonded thereto. FIG. 9 shows a partial cross section through the anchoring plate 31 of FIG. 8. The fastening element can have any property of a state-of-the art fastener such as a threaded bolt (as depicted) a bolt without a thread, a pin, a nut, a hook, an eyelet, a base for a bayonet coupling, etc. The fastener may in this be constituted essentially like a fastener sold under the trade name "bighead".

Embodiments of the method according to the invention may be especially used for bonding a fastener of this kind to any object by an adhesive resin, including, but not limited to, an object including a structure of fibers embedded in a polymer matrix.

In a first group of embodiments, the fastener is configured like prior art fasteners with an anchoring plate 31 that is essentially plane, for example with a plurality of through openings 33.

In a further group of embodiments, the fastener has a structure adapted to the process. Especially, the anchoring plate 31 may be equipped with distal spacer elements 35 that protrude on a distal side from a distal surface plane of the anchoring plate. Such spacer elements 35 may define a minimum distance between the surface of the first object and the distal surface of the anchoring plate, thereby ensuring that a resin layer of a certain minimal thickness remains between the first and second objects after the process.

In addition or as an alternative to the spacer elements, the distally facing surface of the anchoring plate 31 may include structures like the ones described referring to FIGS. 3-6 or also FIG. 1d.

In embodiments, the structure ensuring that a resin portion of a certain minimal thickness persists during application of the mechanical vibration may have a special importance in view of the approach according to the invention. This is because the flowability of the adhesive resin may be drastically increased by the mechanical vibration, compared to conventional uses of a resin as adhesive.

In the depicted configuration, the spacer elements 35 are collar-like protrusions surrounding the openings 33. However, other arrangements of spacer elements 35 may be possible, including a pattern of discrete spacers distributed across the distal surface of the anchoring plate or including a single peripheral collar extending along a periphery of the anchoring plate, and protruding therefrom towards distally, thereby also confining the resin.

Figure 26:
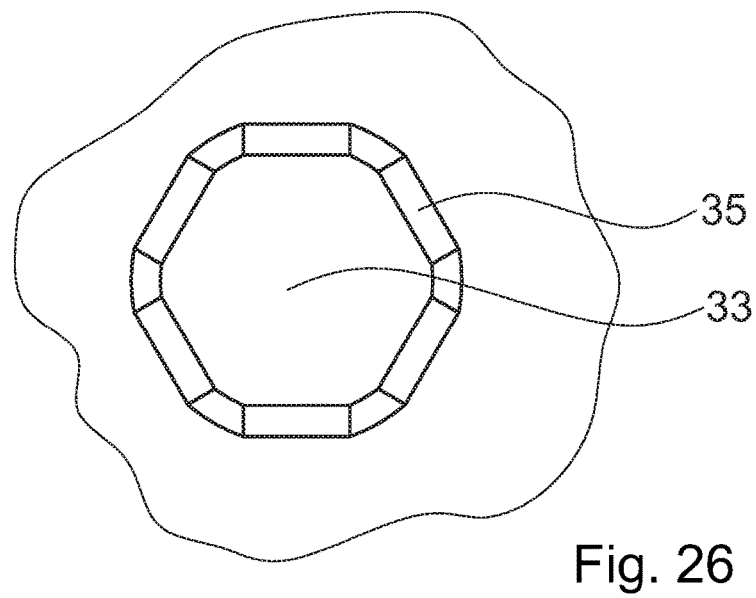
FIG. 26 a partial bottom view of an even further second object.

FIG. 26 illustrates the option of discrete spacer elements 35 surrounding the openings 33 instead of a continuous collar.

In embodiments, in which the second object is a fastener with an anchoring plate and with a fastening element, and in which the fastening element has a portion proximally protruding from the anchoring plate, the tool used for the coupling the mechanical vibration into the second object may be specifically adapted.

Figure 10:
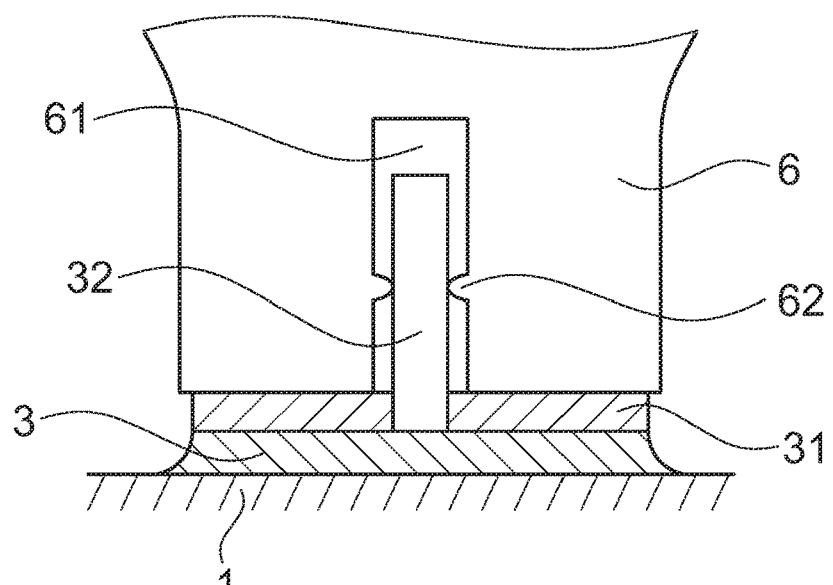
FIGS. 10-14 partial cross sections of further configurations.

FIG. 10 schematically shows a first possibility. The sonotrode has a receiving indentation 61 having a mouth in the distal outcoupling face, in which the fastening element 32 is received when the distal outcoupling face is pressed against the anchoring plate. Thereby the tool (sonotrode) and the second object are adapted to each other for the tool to be pressed directly against a proximally facing surface of the anchoring plate.

The tool may be equipped with a guiding structure, such as inwardly facing guiding protrusions 62 for the second object to be guided relative to the tool. Such guiding structure may especially engage the fastening element, as is the case for the schematically shown guiding protrusions 62 of the embodiment shown in FIG. 10.

Figure 11:
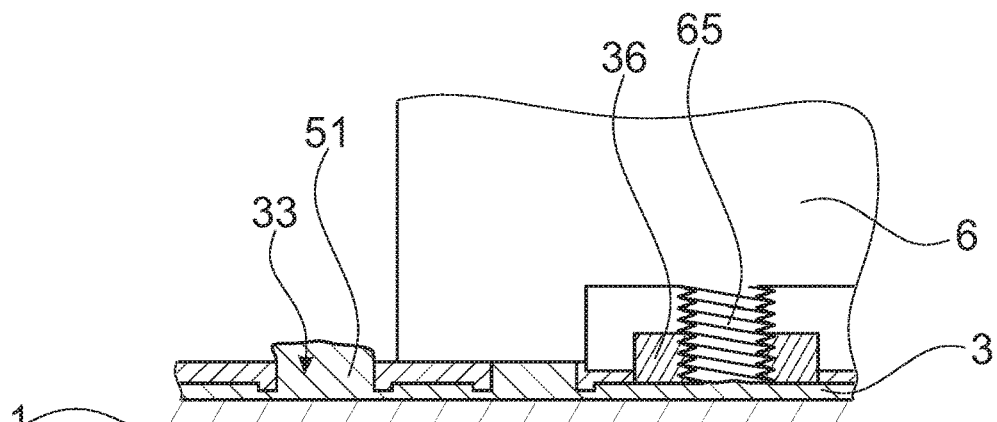

In embodiments, the guiding structure may be configured as fastening structure cooperating with the fastening element to temporarily fasten the second object 2 to the sonotrode. This possibility is schematically shown in FIG. 11. In the example of FIG. 11, the second object/fastener has a nut 36 secured, for example welded, to the anchoring plate, and this nut serves as the fastening structure. The tool 6 includes a threaded protrusion 65 adapted to the inner thread of the nut 36, whereby for the process the fastener can be screwed onto the tool.

Similar configurations are possible for other fastening elements as well, for example, an indentation with an inner thread for cooperating with a threaded bar of the fastener.

Figure 12:
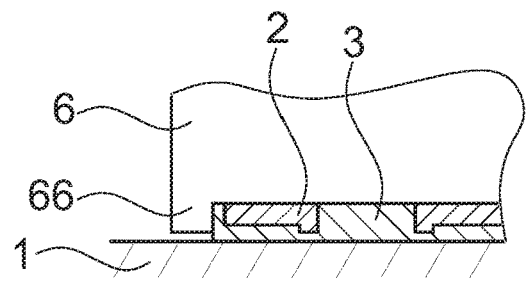

FIG. 12 addresses the possible issue of confining the resin to the location (attachment location) on the attachment surface where the first object is brought into contact with the second object.

A first possibility has been mentioned hereinbefore, namely to provide the second object with a confining feature, for example a peripheral collar.

Figure 27:
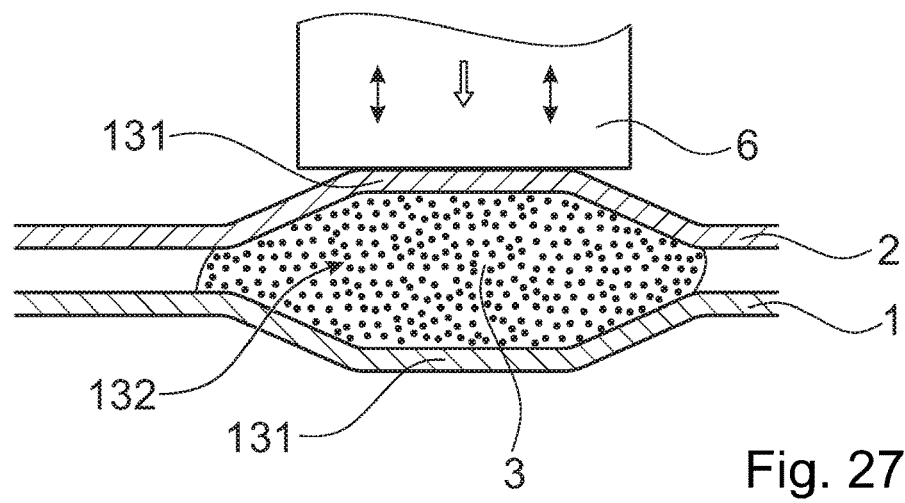
FIG. 27 a section through an assembly of a first object, a second object and a sonotrode, with a resin bead being dispensed between the first and second objects.

FIG. 27 illustrates a variant of this concept. The first object 1 and/or the second object 2 has an indentation 131 towards the resin 3 side (here being an outward bulge), whereby a pocket 132 is formed for the resin. Such pocket may be closed off towards laterally or, as shown in FIG. 27, open towards laterally, whereby a certain lateral flow of the resin 3 remains possible.

In the embodiment illustrated in FIG. 27, both, the first and second objects are illustrated as metal sheets, wherein the respective indentation 131 is formed as a bulge away from the resin side, i.e. towards distally for the first object, and towards proximally for the second object. Of course, depending on the properties of the first/second objects, there are other ways to form a pocket of the illustrated kind, for example by die casting, molding, etc.

Figure 28:
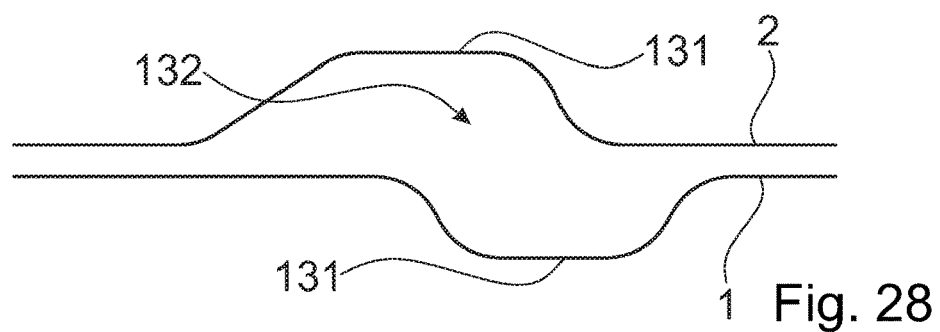
FIG. 28 a variant of an arrangement of a first object and a second object.

FIG. 28 very schematically illustrates the principle that if both, the first and second objects 1, 2 each have an indentation 131 for forming the pocket, the indentations can optionally be laterally offset/shifted with respect to one another, whereby cavitation effects can be reduced.

A second possibility is illustrated in FIG. 12. The tool 6 has a peripheral collar 66 protruding towards distally and thereby confining the resin 3. The dimension of such collar is chosen so that under the applicable conditions, for example taking into account spacer elements of the above-described kind, if present, the collar 66 does not get into direct physical contact with the first object surface during the process.

Figure 13:
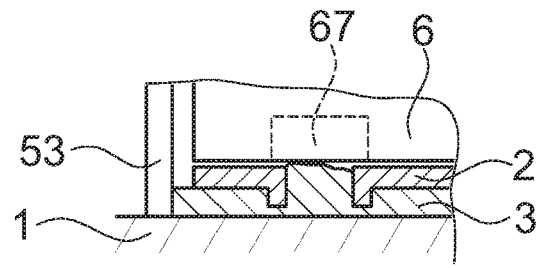

A third possibility is a separate confining element 53, as for example illustrated in FIG. 13. Such separate confining element may for example be a for example short tube element encompassing the tool 6 but being vibrationally de-coupled from the tool 6. Such separate confining element may, prior to dispensing the resin 3 or thereafter, be positioned to surround the attachment location and may for example abut against the proximally facing surface of the first object 1.

The three possibilities may be applied independently from each other or may be combined, also in any sub-combination.

In embodiments, the second object has a through hole, as for example the through holes 33 of an anchoring plate 31. In these embodiments, resin material may flow through the through holes towards proximally. This may have an effect of contributing to the attachment properties, by causing a positive-fit effect, the second object being partially embedded in resin material after the hardening of the latter.

In embodiments in which the second object has a through hole, a measure is taken for preventing resin material from sticking to a surface of the tool after the process. A first such measure is to cause the distally facing outcoupling surface of the tool to have properties preventing such sticking, for example by having a corresponding anti-adhesive coating.

A second optional measure is very schematically illustrated in FIG. 13. The tool may have an indentation 67 at a position corresponding to the position of the through hole. This option is independent of the other features shown in FIG. 13; especially it is applicable independently of the confining element 53.

Figure 14:
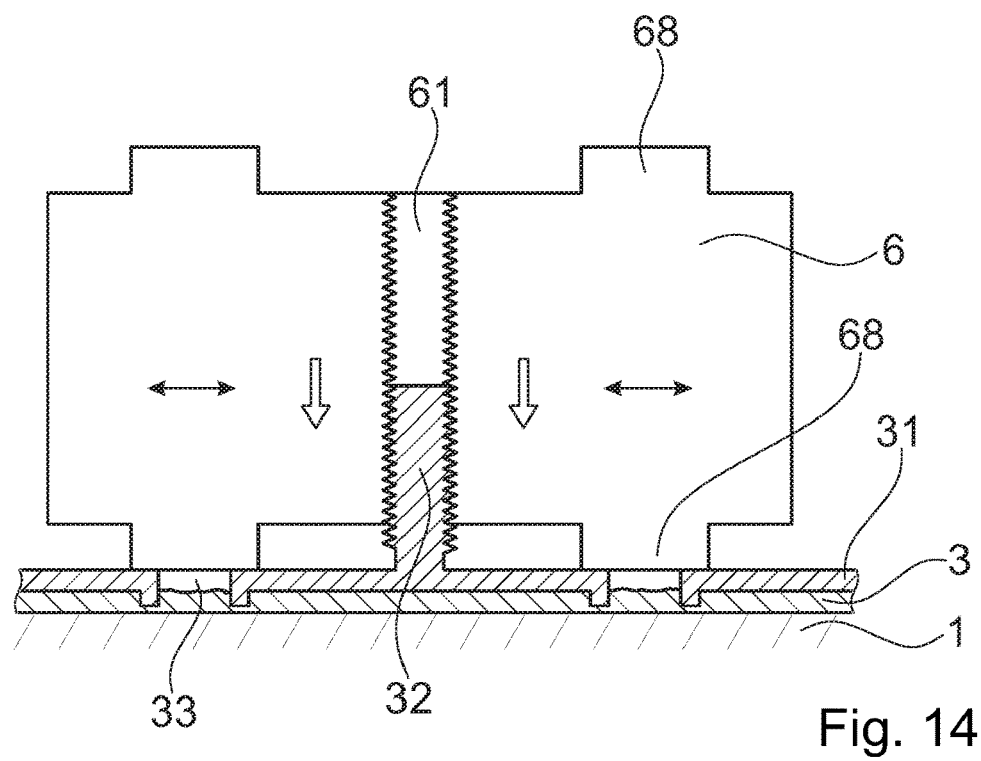

FIG. 14 shows an example of a configuration in which in contrast to the above embodiments the vibration is transverse vibration and not longitudinal vibration. The sonotrode 6 of FIG. 14 is equipped for transverse oscillation. It includes a receiving opening 61 that is configured to receive the fastening structure 32. Especially, in FIG. 14 the receiving opening is illustrated to have an inner thread adapted to the thread of the fastening structure being a threaded bar, with the fastener being as for example shown in FIG. 8. The sonotrode 6 has a ring-shaped skirt 68 that during the process is pressed against a peripheral part of the anchoring plate 31 and thereby couples the pressing force and, together with the receiving opening, the mechanical vibration into the anchoring plate 31. For symmetry reasons, the sonotrode 6 shown in FIG. 14 in addition to the distal ring-shaped skirt 68 that is pressed against the anchoring plate has a proximal ring-shaped skirt 68. Due to this, it would be possible to carry out the process for two assemblies in parallel, the sonotrode being clamped between two first objects pressed against the respective second objects that are introduced from opposite sides. Two more coupling locations could be present on the opposite sides of the sonotrode that are parallel to the drawing plane in FIG. 14.

Figure 15:
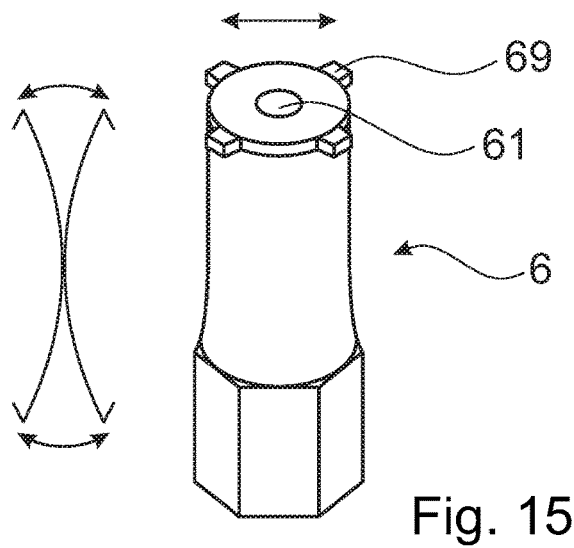
FIG. 15 a view of a sonotrode.

Another sonotrode 6, suitable for example transverse oscillation for example in a 'wedge-reed'-like configuration, is illustrated in FIG. 15. The sonotrode includes a receiving opening 61 for receiving the fastening structure (for example threaded bar). Similarly to the embodiment of FIGS. 11 and 14, the receiving opening may optionally be equipped for a coupling to the fastening structure. The sonotrode is equipped and mounted for transversal vibration of the distal end portion, for example by a vibration coupled into the sonotrode by a coupler acting from sideways and causing a bending oscillation of the sonotrode, as schematically indicated in FIG. 15.

The sonotrode in the depicted embodiment instead of a ring-shaped skirt includes a plurality of wings 69 for coupling the vibration into lateral portions of the anchoring plate. An adaptation to a sonotrode with an outcoupling skirt like in FIG. 14 or with another coupling face would be readily possible.

It is important to note that the concept of transverse vibration discussed referring to FIGS. 14 and 15 can, using appropriate coupling means between the vibrating tool (sonotrode) and the corresponding second object, also be transferred to other second objects/connectors and other fastening concepts described in this text than just the fastener shown in FIG. 14.

Figure 16:
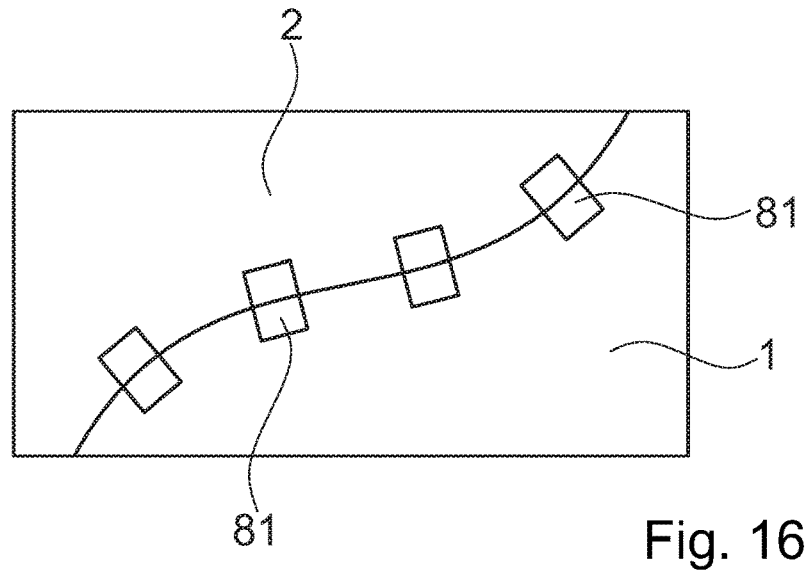
FIG. 16 an assembly of a first and a second object.

FIG. 16 very schematically illustrates a possible application of embodiments of the invention. A first object 1 and a second object are to be bonded to each other by an adhesive connection, wherein the first and second objects are both relatively large. In a manufacturing process, the hardening of the adhesive between the objects until the bond is sufficiently strong for further manufacturing steps may cause a significant delay. The approach according to embodiments of the invention is therefore to use the fastening method described herein at a plurality of discrete spots 81 to activate the resin at these spots. Thereby, the bond is caused to be sufficiently stable in a rapid process. The resin portions between the discrete spots 81 may harden slowly thereafter while the assembly of the first and second objects is subject to further processing steps.

Figure 17:
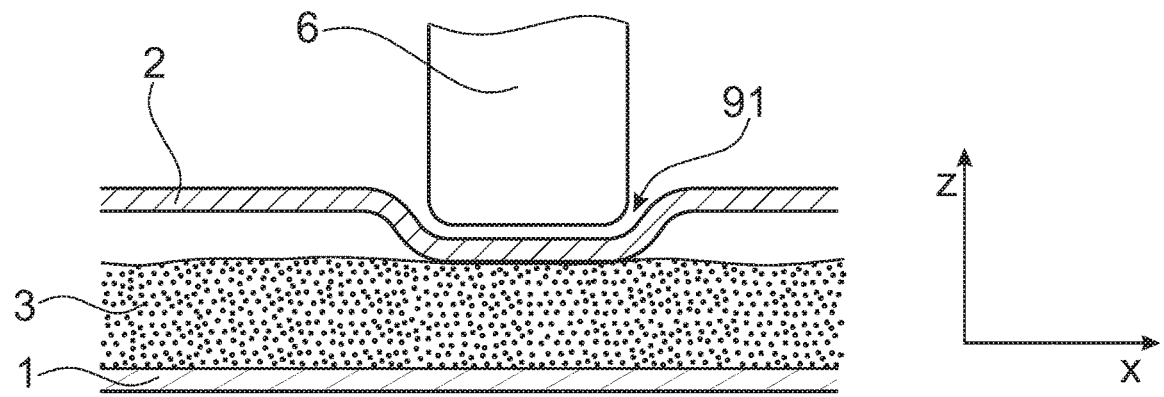
FIGS. 17 and 18 sections through an assembly of a first object, a second object and a sonotrode, with a resin bead being dispensed between the first and second objects.

FIG. 17 depicts an arrangement of a first object 1, a second object 2 and a resin portion 3 therebetween. The second object 2, like, in FIG. 17, also the first object 1, is a relatively thin sheet-like object, for example a metal sheet. Both, the first and second objects are assumed to have relatively large in-plane (x-y)-extension, with the resin portion being applied extensively on the surface of at least one of the objects or, for example by a corresponding robot, an extended adhesive bead. As illustrated with respect to FIG. 16, the surface of the resin may be too large for the mechanical vibration to be applied extensively over the whole area covered by the adhesive, and the hardening may take place at discrete spots only. The remaining portions of the adhesive may harden thereafter at a much slower rate and/or induced by heating.

A possible challenge in this may be that depending on the stiffness of the membrane (metal sheet) it may be difficult to selectively couple the vibration through the second object into the desired spot without too much vibration energy being dissipated by flowing away laterally.

In embodiments, the second object is of a material (for example, a membrane-like thin sheet material) that is locally sufficiently pliable to selectively couple the vibration to that portion of the resin that is immediately underneath the sonotrode that couples the vibration into the second object.

In other embodiments, the second object includes a local deformation, for example embossment that has energy directing properties.

Figure 18:
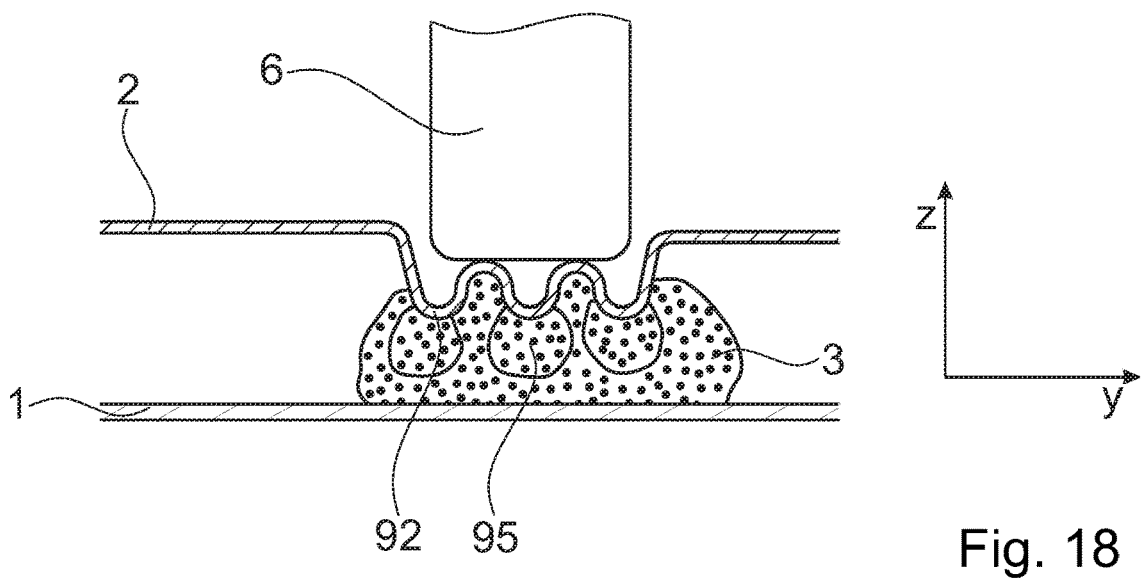

In FIG. 17, the embossment forms a local indentation/bead 91. As shown in FIG. 18, which depicts the configuration of FIG. 17 in a section along a plane perpendicular to the section plane of FIG. 17, the indentation forms a corrugation at the bottom. Thereby, a plurality of effects may be achieved:

The indentation as a whole and especially the corrugation provide pronounced structures, such as edges, that have energy directing properties. Absorption of vibration energy takes place in an intensified manner at these structures. As a consequence, the hardening process sets in around these structures, as indicated by the regions 95 in FIG. 18.

The structure influences the vibration behavior and may somewhat de-couple the regions in the indentation 91 from regions around the indentation 91.

Figure 19:
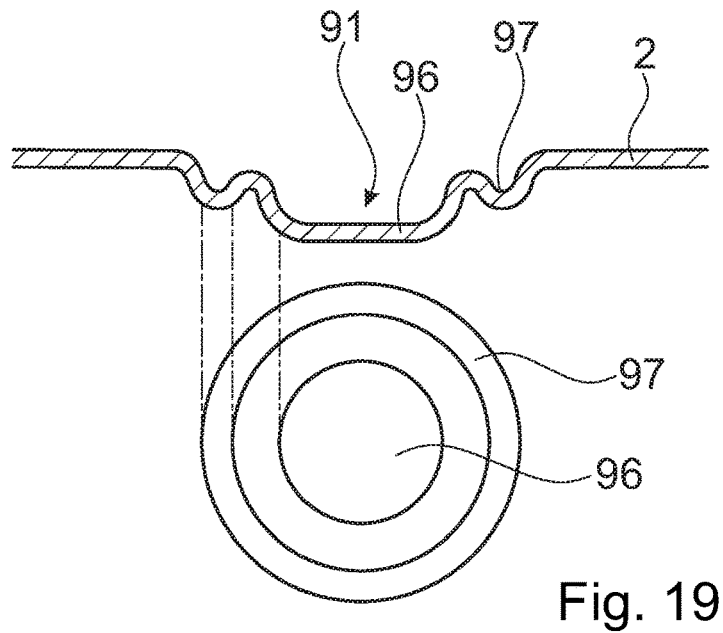
FIG. 19 an example of a second object.

The indentation with the structure serves as interior distance holder when the first and second objects are pressed against each other with the resin still being flowable, thereby defining the thickness of the adhesive portion after the process FIG. 19, depicting a second object 2 in cross section (upper panel) and in a top view (lower panel), shows a variant of a structure with an indentation (that may optionally be provided with an additional structure, similar to FIG. 18), in which variant the indented region is surrounded by an embossed groove 97 that serves as joint-like structure for making vibrations primarily of the part encompassed by the groove possible.

The embodiments of FIGS. 27-28 discussed hereinbefore are further examples of embodiments that include selectively coupling the vibration through the second object into the desired spot without too much vibration energy being dissipated by flowing away laterally—similarly to the embodiments of FIGS. 17-19 but with the difference that the adhesive is not displaced sideways but kept in place due to the outward bulges of the second and/or first objects.

Figure 20:
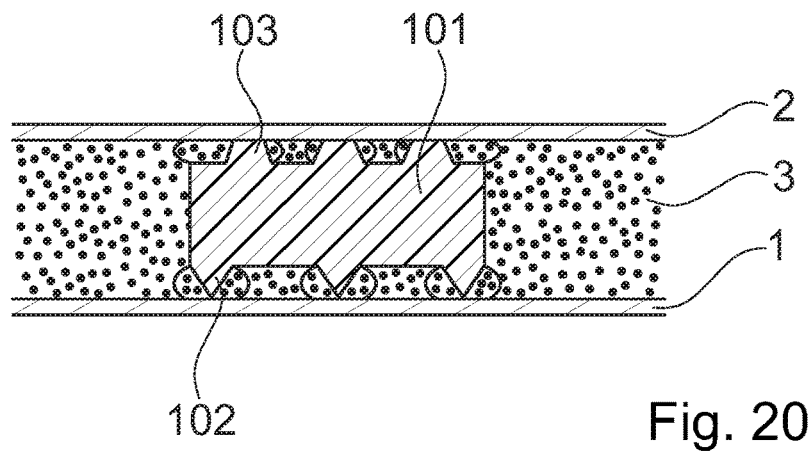
FIG. 20 a section through an arrangement with an auxiliary element.

A further possible solution to the problem of selectively coupling vibration energy into a desired spot is illustrated in FIG. 20. Between the first object 1 and the second object 2 an auxiliary element 101 is positioned. The auxiliary element serves as distance holder thereby defining the thickness of the resin portion 3. It includes a thermoplastic material capable of being liquefied by mechanical vibration energy. When mechanical vibration energy is applied, for example, to the second object locally at the position of the auxiliary element 101 while the second object 2 and the first object 1 are pressed against each other, the thermoplastic material of the auxiliary element absorbs vibration energy, especially due to external and/or internal friction, and thereby is locally heated. As a consequence, heat is conveyed also to surrounding resin material 3.

In embodiments, like in FIG. 20, the auxiliary element 101 has energy directors 102, 103, for example being ridges, tips or other protrusions. FIG. 20 shows first energy directors 102 at the interface to the first object 1 to be more pronounced than second energy directors 103 at the interface to the second object to compensate for an asymmetry arising from the fact that the vibrations in the depicted embodiment will be coupled into the second object and not directly into the first object.

FIG. 20 illustrates regions around the energy directors in which regions the activation of the resin material is predominating.

Figure 21:
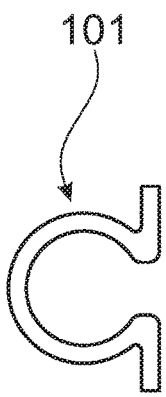
FIGS. 21-23 top views of embodiments of auxiliary elements.
Figure 22:
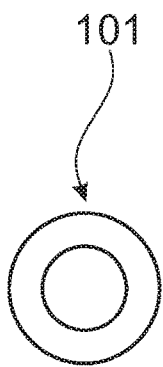
Figure 23:
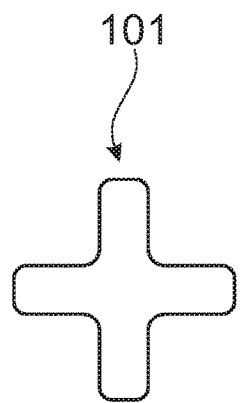

FIGS. 21-23 show top views on different auxiliary elements, thereby illustrating possible auxiliary element shapes. Generally, in embodiments it may be advantageous if the auxiliary element has a shape different form a mere disk so that the lateral surfaces are larger and thereby the interface to the resin is larger.

Figure 24:
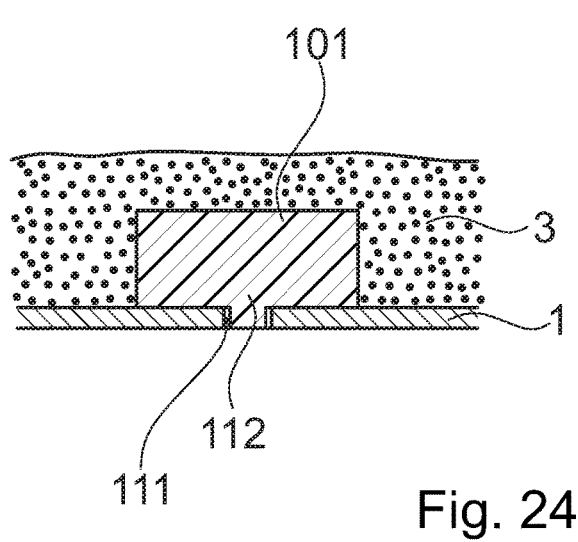
FIG. 24 an auxiliary element with a guiding nipple.

FIG. 24, again showing a section, depicts an option of providing the auxiliary element 101 with a guiding nipple 112 cooperating with a guiding hole 111 of the first object 1 to define the exact position of the auxiliary element with respect to the first object.

In addition or as an alternative to thermoplastic material, an auxiliary element may also include other materials. In embodiments, for example, the auxiliary element may include an elastomeric material. Elastomeric materials are usually not thermoplastic but nevertheless absorb vibration energy and are thereby heated by internal friction.

Figure 29:
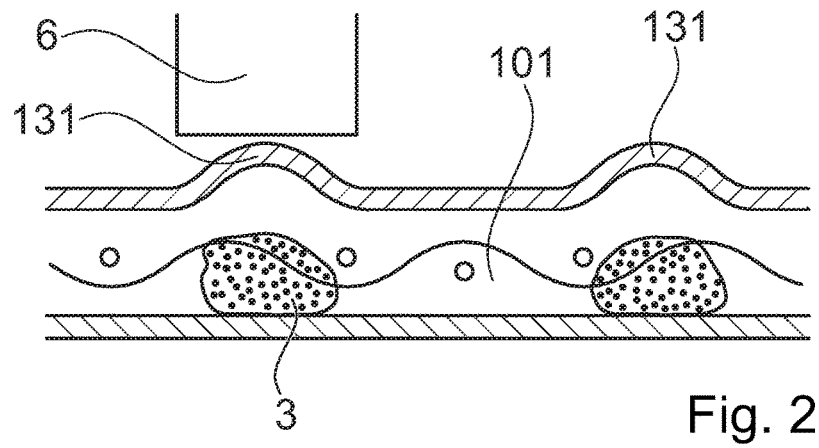
FIG. 29 a further section through an assembly of a first object, a second object and a sonotrode, with a resin bead being dispensed between the first and second objects and with an auxiliary element.

FIG. 29 illustrates an auxiliary element 101 in the form of a mesh, for example an elastomeric mesh. Such a mesh has the advantage that it can be placed between the first and second objects for the process without any precision in placement being required. For example, the auxiliary element 101 may be placed as strip along a glue line, for example immediately before or after the application of a glue bead from a corresponding nozzle, i.e. by a same system.

Figure 30:
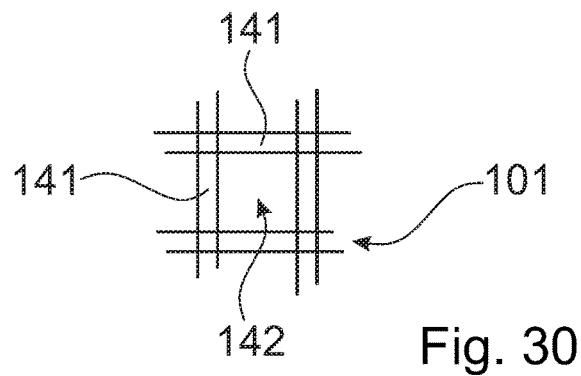
FIG. 30 a partial top view of an auxiliary element.

The mesh may be chosen such that the free volume—i.e., the volume that remains between the strands 141—see FIG. 30—is substantial, and corresponds to for example at least 70% or at least 80% of the overall volume.

The resin 3 may be dispensed over a large surface or, as illustrated in FIG. 29, selectively at desired places, for example adapted to the shape of the first and/or second object, for example by a dispensing tool. If the resin is placed selectively, it may be placed over the mesh or also selectively only into the spaces 142 between the strands 141.

The embodiment of FIG. 29 further has (optional) indentations 131 of the first and/or second object—of the second object in FIG. 29, having the functions described referring to FIGS. 27 and 28 and/or described referring to FIG. 17-19 (de-coupling and/or defined thickness).

Figure 31:
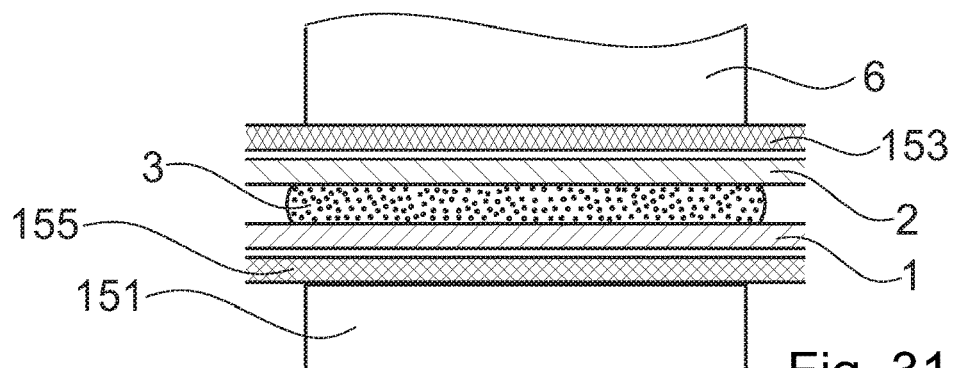
FIG. 31, again in section, an arrangement during the process, wherein the arrangement further includes control foils.

FIG. 31 shows the principle of using at control foil 153, 155. Such foil 153, 155 may be placed between the vibration tool (sonotrode 6) and the second object 2 or between a non-vibrating support 151, on which the assembly is placed for the process, and the first object 1, or both.

FIG. 31 illustrates both, a first control foil 153 between the sonotrode 6 and the second object, and a second control foil 155 between a non-vibrating support 151 and the first object 1.

Such control foil may include a plastic that does not become flowable under the conditions that apply during the process. An example of such a foil material is polytetrafluoroethylene (PTFE). A further suitable material is paper.

A control foil of the kind illustrated in FIG. 31 has been shown to substantially increase the efficiency in experiments, especially with hard non-vibrating supports. Instead of the first control foil 153 and/or the second control foil 155, a coating of the sonotrode 6 and/or the support 151, respectively, could be used.

Figure 32:
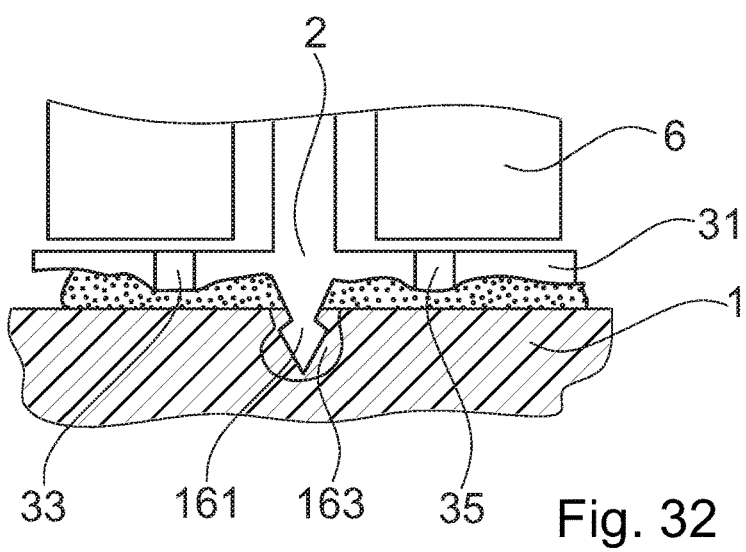
FIG. 32 an even further section through an assembly of a first object, a second object and a sonotrode, with resin being dispensed between the first and second objects.

FIG. 32 shows an arrangement in which the first object 1 is at least partially thermoplastic and in which the second object 2 including a distal piercing portion 161 that is equipped to pierce into the first object during the process.

In embodiments, like the embodiment of FIG. 32, the at least one distal piercing portion 161 protrudes distally from an anchoring plate 31 or other distally facing stopping surface.

The distal piercing portion may, for example, include tapering tip with or without an undercut (FIG. 32 shows an undercut with respect to axial directions).

The piercing portion during the process acts as vibration energy director locally liquefies the thermoplastic material penetrated by the piercing portion. The local absorption of vibration energy leads to a local heating of the assembly around the interface between the piercing portion and the first object, whereby the resin is subject to additional local activation, as explained hereinbefore.

The piercing portion for the mentioned reasons provides a quick and primary stability, even if not the entire resin is hardened out. This may be important in manufacturing processes where the assembly needs to quickly have sufficient stability to move on to a next manufacturing step.

As an alternative to the first object being at least partially thermoplastic and the second object having a piercing portion at locations where the first object is thermoplastic, this concept may be used in the following alternative configuration:

The second object (into which in these embodiments the vibration is coupled) is at least partially thermoplastic and the first object includes a piercing portion at places where the second object is thermoplastic, The first object or the second object is porous or capable of developing pores under hydrostatic pressure, and the second object or the first object, respectively, include a piercing portion of a thermoplastic material. Due to the mechanical vibration energy, the thermoplastic material liquefies and penetrates into pores of the respective other object, whereby, after re-solidification, a positive-fit connection is achieved. Also this will yield a quickly stable connection for primary stability.

Figure 33:
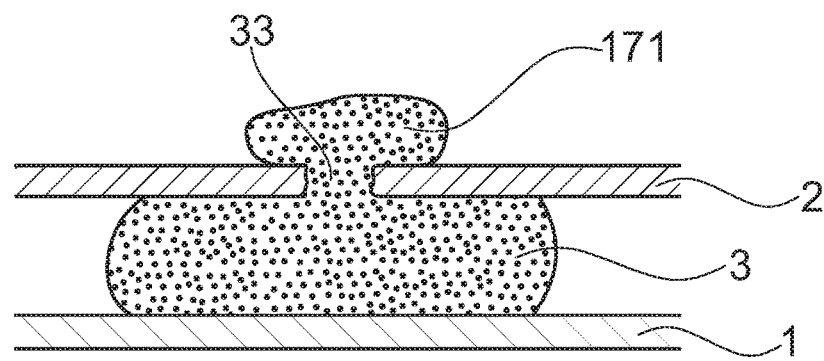
FIG. 33, in section, an arrangement with a positive-fit connection.

FIG. 33 illustrates the principle of using the resin 3 for a positive-fit connection in addition to the adhesive bond. To this end, the second and/or first object is provided with a structure for the resin to flow into in a manner that after re-solidification an undercut is achieved. In the embodiment of FIG. 33, this structure is constituted by an appropriately placed through opening 33 of the second object 2 through which the resin is pressed to flow back towards proximally to form, after solidification, a button-like feature 171.

Figure 34:
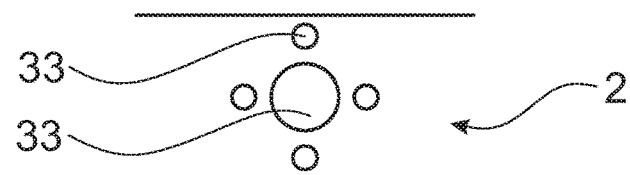
FIG. 34 a partial top view of a second object for the arrangement of FIG. 33.

As illustrated in FIG. 34, a pattern of such openings 33 may be present. In addition or as an alternative to the second object 2, at least one of such openings may also be present in the first object 1.

Figure 35:
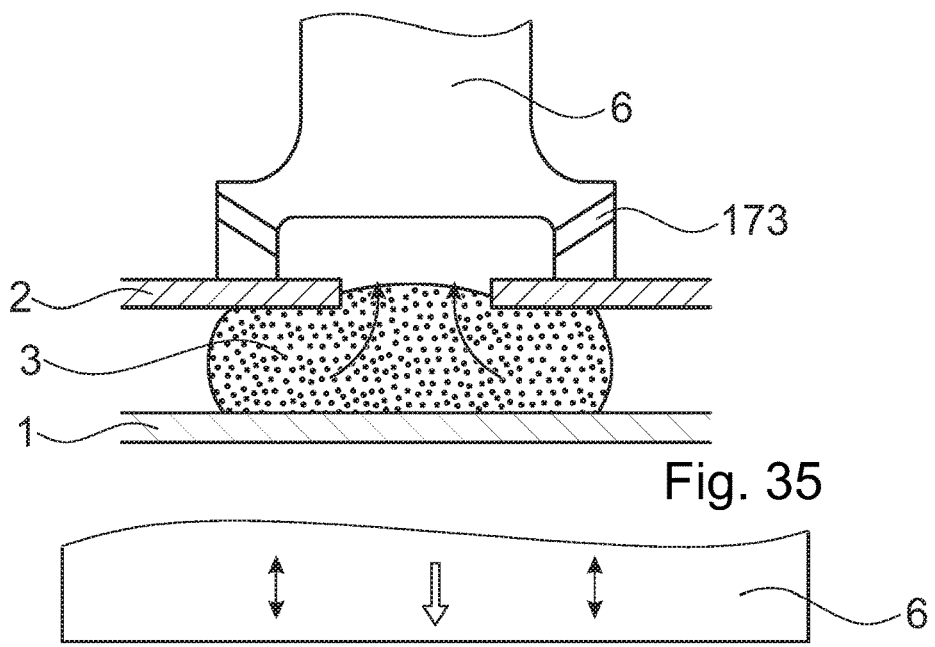
FIGS. 35 and 36 yet further sections through an assembly of a first object, a second object and a sonotrode, with resin being dispensed between the first and second objects.

FIG. 35 illustrates a sonotrode with a glue reservoir proximally of the second object, and with optional pressure release holes 173. If opening(s) is/are present in the first object, a non-vibrating support (not shown in FIG. 35) may be provided with a corresponding structure with a glue reservoir and optional pressure release holes.

In special embodiments, the concept with a flow-back discussed referring to FIGS. 33-35 may optionally be applied to configurations according to the principles discussed referring to FIGS. 11 and 12.

Figure 36:
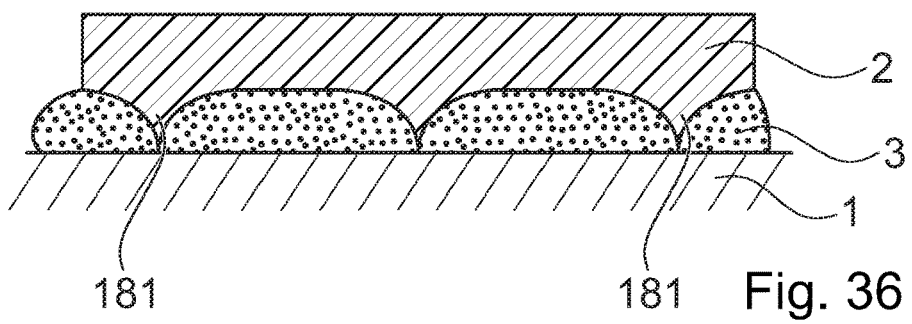

FIG. 36 shows a further option of an assembly in which the second object 2 is shaped to achieve rapid primary stability of the connection at spot gluing points. In contrast to the embodiment of FIG. 32, however, the second object does not pierce the first object.

The second object in FIG. 36 is thermoplastic with a plurality of protrusions 181 that distally for example end in a tip or edge. When the vibration and pressing force are coupled into the second object 2, at the interface of these protrusions with the first object—that can be of a hard material, such as metal or a fiber reinforced composite—energy will be absorbed leading to a local melting of the protrusions 181. The protrusions as a consequence will be deformed (FIG. 37) to yield distance holding spacer structures 182, and the mechanical resistance against a further movement of the second object 2 towards the first object 1 will gradually increase. Also, due to the energy absorption at the protrusions, the resin 3 will be subject to additional local activation around the protrusions leading to local hardened zones 183 that ensure primary stability spots even if not the entire resin is hardened yet.

Figure 37:
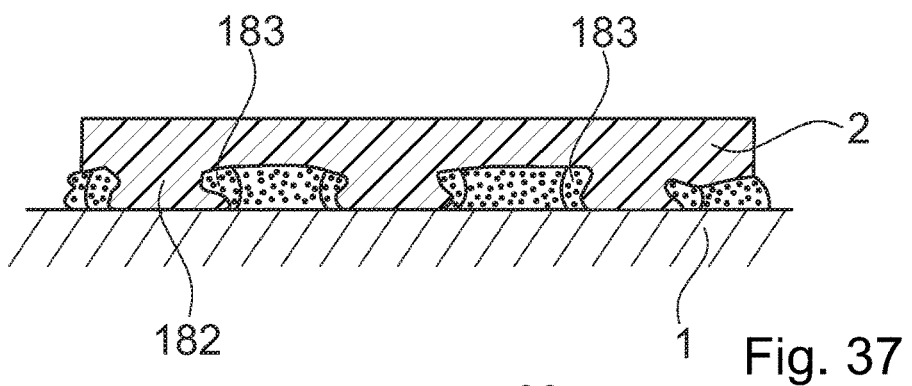
FIG. 37 an assembly resulting after the process shown in FIG. 36.
Figure 38:
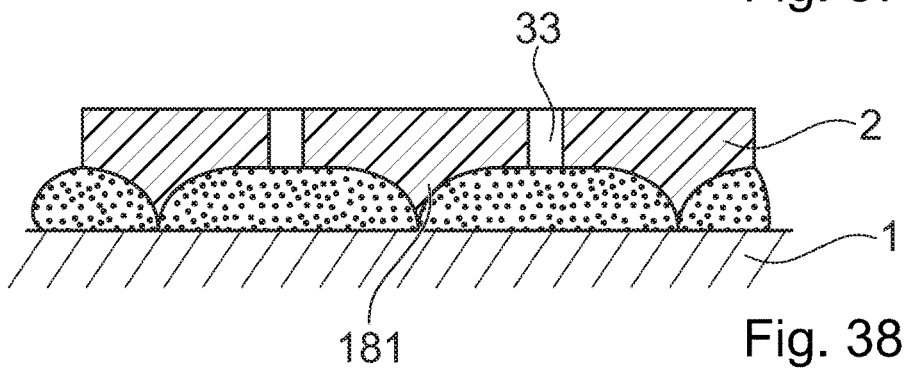
FIG. 38 a variant of the assembly of FIG. 36 without the sonotrode.

FIG. 38 illustrates that also in embodiments realizing the principle described referring to FIGS. 36 and 37, through openings 33 are an option, optionally with the functionality described referring to FIGS. 33-35.

In addition or as an alternative, it is an option to add a piercing portion 161 to the first object 1 and/or, if for example the second object has a section of thermoplastic material to the second object 2.

Figure 39:
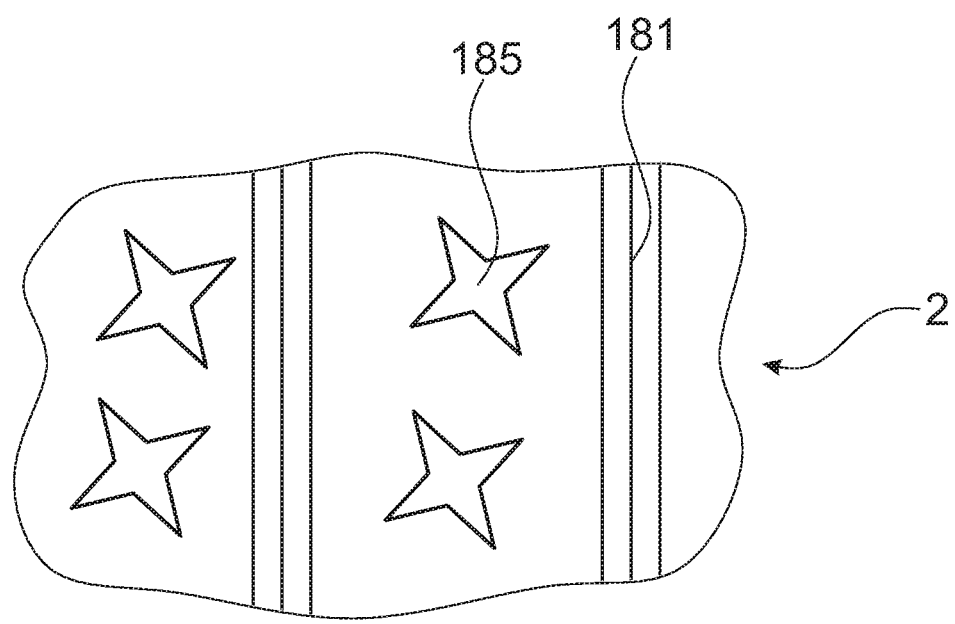
FIG. 39 a partial bottom view of a second object.

FIG. 39 shows that in addition to the first kind of protrusions 181 with a tip or edge (in FIG. 39, the protrusions are illustrated to be elongate with a distal edge) also flat, distance holding protrusions 185 that extend distally less far than the first kind of protrusions may be present. In FIG. 39, they are illustrated to have a star shape and to be discretely distributed over the surface. Other arrangements, for example with discrete protrusions of the first kind and/or with elongate distance holding protrusions are possible. In summary, the protrusions may be distributed to optimize all of:

The arrangement and distribution of locations where an immediate activation of the resin during the process takes place (primary stability points)

The control of the resin flow during the process

A uniform mechanical support and distance definition during the process.

What is claimed is:

1. A method of fastening a second object to a first object, the method comprising the steps of:
   providing the first object comprising a first attachment surface;
   providing the second object, wherein one of the first object and the second object is at least partially made of a thermoplastic material;
   placing the second object relative to the first object, with a resin between the first attachment surface and a second attachment surface of the second object;
   while the resin is in contact with the first attachment surface and the second attachment surface, causing mechanical vibration to act on the second object or the first object or both, thereby activating the resin to cross-link and causing at least a flow portion of the thermoplastic material to become flowable; and
   allowing the flow portion to re-solidify;
   wherein after the step of allowing the flow portion to re-solidify, the first object is fastened to the second object by a joint effect of:
      the resin, after cross-linking, securing the second object to the first object, and
      a positive-fit connection between the re-solidified flow portion and at least one of the first object, the second object, and the resin.

2. The method according to claim 1, wherein the mechanical vibration is a longitudinal vibration.

3. The method according to claim 1, wherein the mechanical vibration has a frequency between 15 kHz and 200 kHz.

4. The method according to claim 1, wherein the step of causing the mechanical vibration to act comprises pressing a vibrating tool against a proximal coupling face of the second object.

5. The method according to claim 1, further comprising pressing the second object and the first object against each other while causing the mechanical vibration to act.

6. The method according to claim 1, wherein the resin is in a flowable state in the step of placing the second object relative to the first object.

7. The method according to claim 1, wherein one of the first object and of the second object has a piercing portion that is equipped to pierce into the thermoplastic material during the step of causing the mechanical vibration to act.

8. The method according to claim 1, wherein the thermoplastic material comprises at least one energy director that during the method is caused to be in contact with the first object or the second object.

9. The method according to claim 1, wherein:
   one of the first object and the second object has at least one protrusion of the thermoplastic material,
   in the step of placing the second object relative to the first object, the at least one protrusion is caused to abut against the other one of the first object and the second object, and
   in the step of causing at least the flow portion of the thermoplastic material to become flowable, the protrusion is deformed.

10. A method of fastening a second object to a first object, the method comprising the steps of:
    providing the first object comprising a first attachment surface;
    providing the second object;
    placing the second object relative to the first object, with a resin between the first attachment surface and a second attachment surface of the second object;
    while the resin is in contact with the first attachment surface and the second attachment surface, causing mechanical vibration to act on the second object, thereby activating a portion of the resin to cross-link, whereas a further portion of the resin is not activated to cross-link by the mechanical vibration;
    wherein the resin, after cross-linking, secures the second object to the first object.

11. The method according to claim 10, wherein the second object has a sheet portion, and wherein the step of causing the mechanical vibration to act causes the mechanical vibration to act on the sheet portion.

12. The method according to claim 10, wherein the step of causing the mechanical vibration to act is repeated for a plurality of discrete locations of an assembly comprising the first object, the second object, and the resin.

13. The method according to claim 10, wherein the second object has an indented portion, and wherein in the step of causing the mechanical vibration to act, a vibrating tool is in contact with the indented portion.

14. The method according to claim 10, wherein the second object has a corrugated portion, and wherein in the step of causing the mechanical vibration to act, a vibrating tool is in contact with the corrugated portion.

15. The method according to claim 10, further comprising a step of providing an auxiliary element comprising thermoplastic material capable of absorbing the mechanical vibration,
    wherein in the step of causing the mechanical vibration to act, the auxiliary element is placed between the first object and the second object and absorbs the mechanical vibration, thereby heating the resin in a vicinity of the auxiliary element.

16. The method according to claim 15, wherein the auxiliary element comprises at least one energy director.

17. The method according to claim 15, wherein the auxiliary element is a flexible planar structure.

18. The method according to claim 17, wherein the flexible planar structure is a mesh.

19. The method according to claim 15, wherein in the step of placing the second object relative to the first object, the auxiliary element serves as a distance holder between the first object and the second object, thereby defining a thickness of the resin.

20. A method of fastening a second object to a first object by an adhesive connection, the method comprising the steps of:
    providing the first object comprising a first attachment surface;
    providing the second object;
    placing the second object relative to the first object, with a resin between the first attachment surface and a second attachment surface of the second object;
    while the resin is in contact with the first attachment surface and the second attachment surface, causing mechanical vibration to act on a plurality of discrete spots of the second object or the first object or both, thereby activating discrete portions of the resin to cross-link while other portions of the resin are not cross-linked by the mechanical vibration; and
    allowing the other portions of the resin to cross-link while the second object is held in a position relative to the first object by the discrete portions of the resin, whereby the discrete portions of the resin ensure a primary stability of the adhesive connection;

wherein the discrete portions and the other portions of the resin, after cross-linking, secure the second object to the first object.

21. The method according to claim 20, further comprising a step of providing an auxiliary element comprising thermoplastic material,
wherein in the step of causing the mechanical vibration to act, the auxiliary element is placed between the first object and the second object and absorbs the mechanical vibration, thereby heating the resin in a vicinity of the auxiliary element.

22. The method according to claim 20, wherein the second object has an indented portion, and wherein in the step of causing the mechanical vibration to act, a vibrating tool is in contact with the indented portion.

* * * * *